US006979980B1

(12) United States Patent
Hesterman et al.

(10) Patent No.: US 6,979,980 B1
(45) Date of Patent: Dec. 27, 2005

(54) SOFT SWITCHING INTERLEAVED POWER CONVERTER

(75) Inventors: Bryce L. Hesterman, Fort Collins, CO (US); Milan Ilic, Fort Collins, CO (US); Andrey B. Malinin, Fort Collins, CO (US); Kalyan N. C. Siddabattula, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 0 days.

(21) Appl. No.: 10/925,832

(22) Filed: Aug. 24, 2004

(51) Int. Cl.[7] ......................... G05F 1/656; G05F 1/613
(52) U.S. Cl. ....................... 323/222; 323/274; 323/284
(58) Field of Search ............................... 323/222, 266, 323/273, 274, 282, 284

(56) References Cited

U.S. PATENT DOCUMENTS

| | | | | |
|---|---|---|---|---|
| 5,204,809 A | | 4/1993 | Andresen | |
| 5,307,004 A | | 4/1994 | Carsten | |
| 5,932,995 A | | 8/1999 | Wagoner | |
| 6,147,886 A | * | 11/2000 | Wittenbreder | 363/95 |
| 6,184,666 B1 | | 2/2001 | Boeckmann et al. | |
| 6,211,657 B1 | | 4/2001 | Goluszek | |
| 6,404,175 B1 | * | 6/2002 | Yang et al. | 323/282 |
| 6,560,127 B2 | * | 5/2003 | Wittenbreder, Jr. | 363/17 |
| 6,690,589 B2 | * | 2/2004 | Barnett et al. | 363/72 |
| 6,850,045 B2 | * | 2/2005 | Muratov et al. | 323/272 |
| 6,897,641 B1 | * | 5/2005 | Herbert | 323/282 |

OTHER PUBLICATIONS

Gang Yao et al., Interleaved Three-Level Boost Converter with Zero Diode Reverse-Recovery Loss; IEEE APEC Feb. 22-26, 2004; pp. 1090-1095.

* cited by examiner

*Primary Examiner*—Bao Q. Vu
(74) *Attorney, Agent, or Firm*—Benjamin Hudson, Jr.; John D. Pirnot

(57) ABSTRACT

There is provided by this invention soft switching interleaved power converters that are suitable for high power and high voltage applications such as plasma processing. They have greatly reduced switching losses and diode reverse-recovery losses which allows operation at high switching frequencies. The peak values of the reverse-recovery currents of the diodes are substantially less then their peak forward operating currents. The power converters incorporate power converter cells that comprise a plurality of switching assemblies that are operated with an interleaved switching pattern, and that are each connected to an input terminal of an inductor assembly that also has a common terminal. The inductance between each pair of input terminals is less than the inductance between each input terminal and the common terminal of the inductor assembly.

19 Claims, 19 Drawing Sheets

SOFT SWITCHING INTERLEAVED POWER CONVERTER

BACKGROUND OF THE INVENTION

1. Field of the Invention

This invention relates generally to soft switching switch mode power converters, and more particularly, to soft switching buck, buck-boost and boost switch mode power converters suitable for high power and high voltage applications such as plasma processing.

2. Brief Description of the Prior Art

It is generally desirable to operate switching power supplies at the highest frequency that is practical for a particular circuit. Operating at higher frequencies allows the inductor and capacitor values in a power supply to be reduced, and this reduces physical size and cost, and also enables improvements in the transient response of the power supply. Reducing the energy available for delivery to plasma arcs is also a desirable goal. High-frequency operation allows the use of smaller output filter capacitors, which store less energy than larger capacitors, and this reduces the energy that can be supplied to plasma arcs.

The operating frequencies prior art power supplies that utilize hard-switching power converters are limited because the switching losses can become prohibitively high as the operating frequency is increased.

FIG. 1 shows a prior art hard-switched power converter cell HSPCC that can be used to implement prior art hard-switched buck, buck-boost and boost power converters as shown in FIGS. 4–6 respectively. The hard-switched power converter cell HSPCC has three terminals: an active terminal AT, a passive terminal PT, and an inductive terminal IT. The power converter cell is comprised of a switch assembly SA and an inductor L. The switch assembly has an active switch terminal AST that is connected to the active terminal AT, a passive switch terminal PST that is connected to the passive terminal PT and a common switch terminal CST. The inductor L is connected between the common switch terminal CST and the converter inductive terminal IT.

The switch assembly has two switches: switch SAC that is connected between active switch terminal AST and common switch terminal CST, and switch SPC that is connected between passive switch terminal PST and common switch terminal CST. Switch SAC always comprises an active switch such as a transistor, and may also comprise an anti-parallel diode, while the SPC switch may comprise a diode, an active switch or both.

FIGS. 2 and 3 show two implementations of switch assembly SA in which switch SAC comprises an active switch SA connected in parallel with an anti-parallel diode APD, and in which switch SPC is a freewheeling diode FD. Ideally, the two switches in a switch assembly SA are never on simultaneously, but in hard-switched power that operate in a manner such that the currents in the filter inductors do not reach zero within a switching cycle (continuous conduction mode), a freewheeling diode must be turned off every time a switching transistor is turned on. A reverse current called the reverse-recovery current flows through the freewheeling diodes during the time interval when they are being turned off. The time it takes for a diode to turn off is called the reverse-recovery time. During the reverse-recovery time interval, a large diode reverse-recovery current to flows through the switches while the voltage across them is high. This produces switching losses that may be prohibitively high in hard switching power converters that operate at high voltage and power levels while switching at high frequencies.

Switch assemblies having SPC switches that are implemented as freewheeling diodes may be categorized as positive switch assemblies such as the PSA of FIG. 2, or negative switch assemblies such as the NSA of FIG. 3. A positive switch assembly blocks current from flowing between the active switch terminal AST and common switch terminal CST while the SAC switch is off and the active switch terminal AST is positive with respect to the common switch terminal CST. A negative switch assembly blocks current from flowing between the common and active switch terminals while the SAC switch is off and the active switch terminal is negative with respect to the common switch terminal.

FIGS. 4–6 show hard-switched power converters that are implemented with hard-switched power converter cells. FIG. 4 shows a hard-switched buck power converter HSBKPC, FIG. 5 shows a hard-switched buck-boost power converter HSBPC, and FIG. 6 shows a hard-switched boost power converter HSBTPC. Each of the power converters in FIGS. 4–6 has a converter input terminal CIT, a converter common terminal CCT, and a converter output terminal COT. Input power is supplied between the input and common terminals having an input voltage $V_{in}$, and power is delivered between the output and common terminals, between which there is an output voltage $V_{out}$. The interconnection arrangement among the power converter cell terminals and the power converter terminals determines whether the power converter is a hard-switched buck power converter HSBKPC, a hard switched buck-boost power converter HSBBPC or a hard switched boost power converter HSBTPC. Each power converter shown in FIGS. 4–6 has a converter input capacitor CIC connected between the input terminal and the common terminal, and a converter output capacitor COC connected between the output terminal and the common terminal.

Hard-switching power converter cells HSPCC can be implemented with either a set of positive switch assemblies or a set of negative switch assemblies. A positive hard-switched power converter cell is defined as a power converter cell that is implemented with one or more positive switch assemblies. Similarly, a negative hard-switched power converter cell is defined as a power converter cell that is implemented with one or more negative switch assemblies. The choice of whether to use positive or negative power converter cells depends on the polarity of the voltage to be converted and the converter topology. Positive hard-switched power converter cells PHSPCC are used to implement hard-switched buck HSBKPC and hard-switched buck-boost HSBBPC power converters when the input voltage $V_{in}$ is positive (the converter input terminal CIT is positive with respect to the converter common terminal CCT), and also with hard-switched boost power converters HSBTPC that have negative input voltages (the converter input terminal CIT is negative with respect to the converter common terminal CCT). Conversely, negative hard-switched power converter cells NHSPCC are used in hard-switched buck HSBKPC and hard-switched buck-boost HSBBPC power converters that have negative input voltages, and also in hard-switched boost power converters HSBTPC that have positive input voltages.

The dashed lines in FIG. 4 indicate that multiple power converter cells may be connected in parallel order to share input and output currents of the power converter among two or more converter cells. Parallel-connected power converter cells are preferably operated with an interleaved switching pattern to reduce ripple in the input and output currents. If N converters are connected in parallel, then the switches are preferably operated with an interleaving phase angle difference of 360°/N. Although it is not shown in FIGS. 5 and 6, these power converters may also be implemented with parallel-connected power converter cells.

Interleaved hard-switched power converters are generally known in the prior art. They are commonly used for microprocessor VRM applications with very high output currents and very low output voltages. Having a low output voltage allows use of very fast low voltage diodes, so the switching losses are negligible. In general, high voltage diodes turn off more slowly than low voltage diodes, so switching losses are a particular problem for high-frequency power converters that operate at high voltages and high power levels. When hard-switched power converters are used in high-voltage and high-power applications as disclosed in U.S. Pat. No. 6,211,657, the switching losses will be considerable when the power converter is operated at high switching frequencies.

FIG. 7 shows a prior art interleaved hard-switched buck power converter HSBKPC that is based on FIGS. 2 and 4. The power converter has two parallel-connected positive hard switching power converter cells, PHSPCC1 and PHSPCC2, and it is like the interleaved converter disclosed in U.S. Pat. No. 6,211,657. FIG. 8 shows typical waveforms for an interleaved hard-switched power converter such as the one in FIG. 7 in which slower high voltage diodes are used. The current waveform plots of FIG. 8 have vertical scales of 10 A per division.

The waveforms in FIG. 8 were obtained from a computer simulation of the buck power converter BKPC of FIG. 7 with the following characteristics: input voltage $V_{in}$=750 VDC, output voltage $V_{out}$=400 VDC, output current $I_{out}$=62.5 A, switching period $T_s$=64 $\mu$s, 600 $\mu$H inductors L1 and L2, and a 10 $\mu$F converter output capacitor COC. The capacitance of COC used in the simulation was selected so that the output ripple voltage was negligible, but much smaller capacitors can be used with converters that are intended to operate loads where high-frequency ripple is not critical, such as typical dc plasma loads. The power converter was supplied by an ideal voltage source in the simulation, so the converter input capacitor was not required.

As can be seen in FIG. 8, diode FD1 is conducting when switch SW1 turns on at time $t_0$. A large reverse-recovery current $I_{RD1}$ flows through FD1 as it is being turned off by SW1. The same thing happens with SW2 and FD2 at time $T_s/2$. The freewheeling diode waveforms $I_{FD1}$ and $I_{FD2}$ illustrate how the peak reverse-recovery currents $I_{RD1}$ and $I_{RD2}$ of diodes FD1 and FD2 may be greater than their peak forward operating currents. The large reverse-recovery currents of the freewheeling diodes cause high power dissipation in switches SW1 and SW2 because the voltage across the switches is high during the turn-on switching transition interval. The diode reverse-recovery currents also cause considerable power dissipation in the diodes. Just before a diode is fully turned off, the voltage across it rises while current is still flowing, and this produces high turn-off power losses in the diode due to the simultaneous presence of high voltage and high current.

Because the same switching cells are used in hard-switched interleaved buck-boost and boost power converters, these converters have switching waveforms that are similar to the ones illustrated in FIG. 8. Large current spikes in the freewheeling diodes also occur in hard-switched non-interleaved power converters.

The turn-on losses in switches due to diode reverse-recovery currents can be reduced by adding circuitry that results in having zero, or relatively low, currents flowing through the switches as they are turned on. The turnoff losses of the diodes can be greatly decreased by reducing the current through them gradually instead of suddenly during the commutation interval.

One prior art approach to reducing switching losses due to diode reverse-recovery currents is to use auxiliary or pilot switches and inductors as taught in U.S. Pat. No. 5,307,004. There are two significant drawbacks to this approach. Although the pilot switches and diodes do not process much power in comparison to the main switches and diodes, their sizes are not proportionally smaller in high voltage power converters due to insulation requirements. The cost and size of the driver circuits for the pilot switches are also not proportionally smaller.

U.S. Pat. No. 6,184,666 discloses a buck converter with parallel-connected switches that process equal amounts of power and have equal power dissipation, but the converter does not have soft switching. U.S. Pat. No. 5,204,809 discloses hard-switched synchronous interleaved buck converters with coupled inductors. It teaches that the coupling coefficient should be less than about 0.9, with the optimal value being around 0.5. U.S. Pat. No. 6,426,883 discloses a power converter that uses equal-sized parallel-connected switching components and commutation inductors to achieve soft switching, but the switching pattern allows only one of the paralleled switches to have soft switching while the other switch has hard switching. In order to balance the switching losses, the switching pattern is periodically reversed so that each switch has soft switching half of the time.

For higher-voltage applications, hard-switched power converter cells can be connected in a stacked arrangement to implement hard-switched stacked buck HSSBKPC power converters, hard-switched stacked buck-boost HSSBEPC power converters and hard-switched stacked boost HSSBTPC power converters as shown in FIGS. 9, 10 and 11 respectively. Each of these converters has one positive hard-switched power converter cell, PHSPCC, and one negative hard-switched power converter cell, NHSPCC. Stacking two power converter cells in the configurations illustrated in FIGS. 9–11 allows the operating voltages to be twice those obtainable with non-stacked power converters when using equivalent power converter cells.

U.S. Pat. No. 5,932,995 shows that stacked buck converters can be implemented with hard-switched power converter cells. Various hard-switched stacked power converters are described in: Xinbo Ruan et al., "Three-level converters—a new approach for high voltage and high power DC-to-DC conversion," IEEE 2002 Power Electronics Specialists Conference, vol. 2, pp. 663–668. These hard-switched power converters will have high switching losses when operated at high frequencies in high voltage and high power applications.

It would be desirable if there were provided a soft switching power converter suitable for high power and high voltage applications in which the switches have low turn-on losses, and the diodes have low turn-off losses. It would furthermore be desirable if there were provided a soft switching power converter suitable for high power and high voltage applications in which the diodes and switches in parallel-connected switching assemblies process the same level of power, and are operated with a switching pattern that allows soft switching for each parallel-connected switching assembly.

SUMMARY OF THE INVENTION

There is provided by this invention soft switching interleaved power converters that are suitable for high power and high voltage applications such as plasma processing. They can operate at higher frequencies than prior art converters because they have greatly reduced switching losses and diode reverse-recovery losses. The peak values of the reverse-recovery currents of the diodes are substantially less than their peak forward operating currents. The power converters incorporate power converter cells that comprise a plurality of switching assemblies that are operated with an interleaved switching pattern, and that are each connected to an input terminal of an inductor assembly that also has a common terminal. The inductance between each pair of input terminals is less than the inductance between each input terminal and the common terminal of the inductor assembly.

DETAILED DESCRIPTION OF THE INVENTION

The power converter cells of the present invention are similar in structure to prior art circuits, but they achieve heretofore unknown performance improvements by utilizing inductor assemblies with advantageous structures and inductance values, and by utilizing optimal switching patterns.

Figure 12:
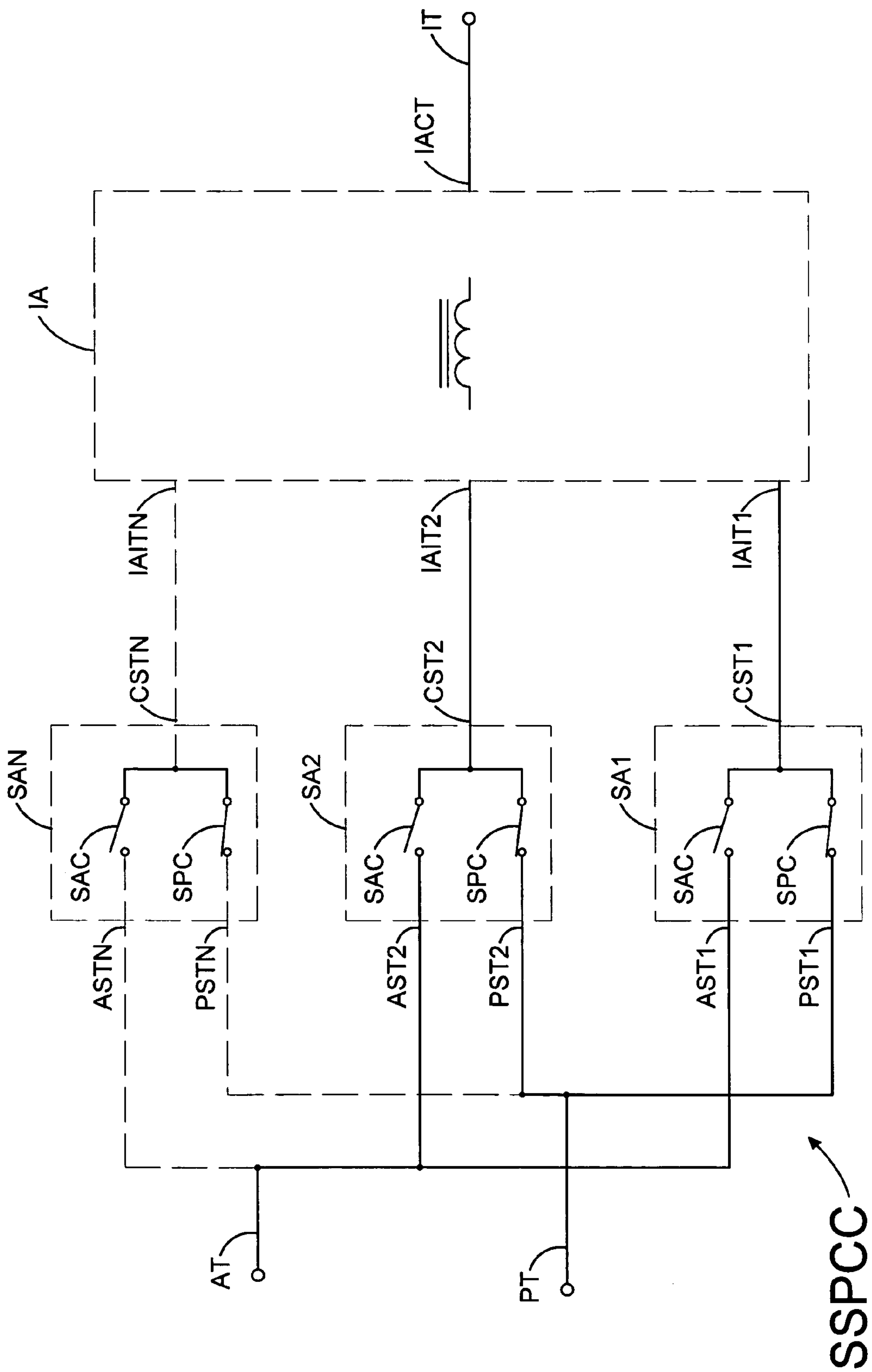
FIG. 12 illustrates a soft-switched power converter cell.

FIG. 12 illustrates a soft switching power converter cell SSPCC according to the present invention. At least two switching assemblies, SA1 and SA2, are connected to active and passive terminals, AT and PT. The possibility of connecting more switching assemblies, for a total of N is indicated by the dashed connections to the Nth switching assembly SAN. The common terminal of each switch assembly, CST1 . . . CSTN is connected to an inductor assembly, IA, at an inductive assembly input terminal, IAIT1 . . . IAITN. An inductor assembly common terminal IACT is connected to the inductive terminal IT of the SSPCC power converter cell.

FIGS. 13–16 show various ways to implement inductor assembly IA. The inductances between pairs of inductor assembly input terminals that are connected to a pair of consecutively operated switching assemblies, $L_{ii}$, is a critical parameter in producing soft switching operation. The inductance between an inductor assembly input terminal and the inductor assembly common terminal IACT, $L_{ic}$, influences the magnitude of the ripple current flowing through the inductive terminal of the switching cell. The $L_{ii}$ inductance values are preferably less than one fifth of the inductance of $L_{ic}$. The inductor assemblies of FIGS. 13–16 can be constructed so as to have the same inductances the between all corresponding pairs of their terminals. If the inductances between the terminal pairs are equivalent for various inductor assemblies, then the converter waveforms will also be equivalent for the same operating conditions, and the total energy stored in each inductor assembly will be the same.

Figure 13:
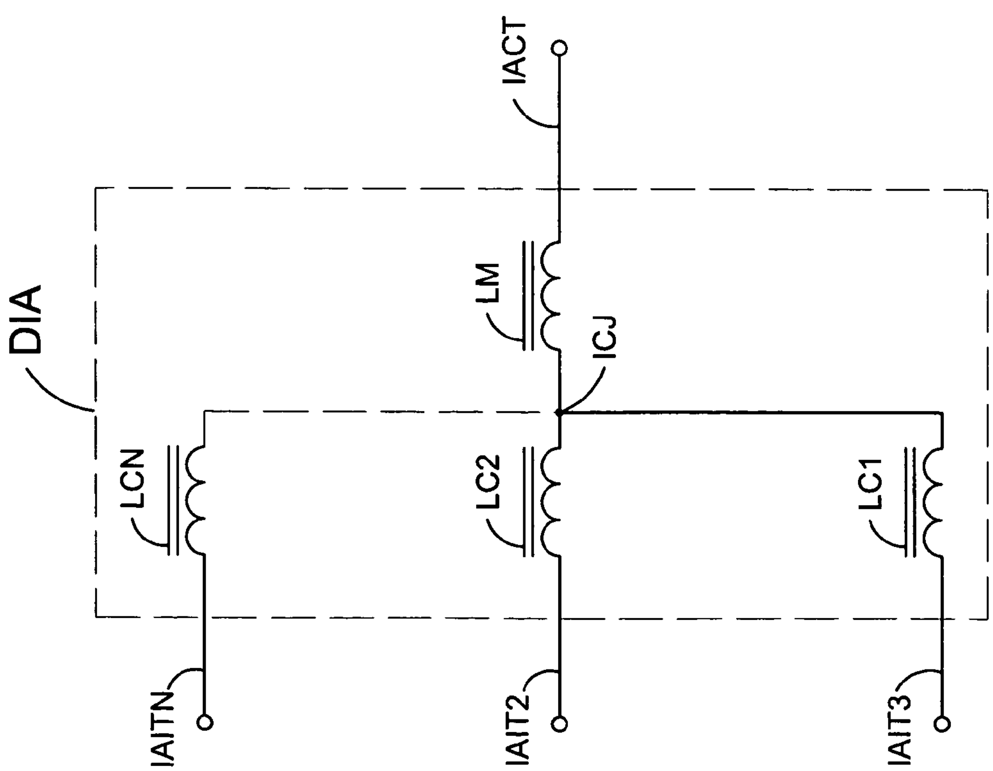
FIGS. 13–16 illustrate details of various embodiments of the inductor assembly IA of FIG. 12.

FIG. 13 shows an inductor assembly implementation DIA in which one of N discrete commutation inductors LC1 . . . LCN is connected between each inductor assembly input terminal IAIT1 . . . IAITN and an inductor common junction ICJ. A main converter inductor LM is connected between junction ICJ and the inductor assembly common terminal IACT. In order to prevent excessively long commutation times, the inductance between inductor assembly input terminals IAIT1 and IAIT2 is preferably less than about one-fifth of the inductance of between each of these terminals and the inductor assembly common terminal IACT. The inductance of the commutation inductors in FIG. 13 is therefore preferably less than one-ninth of the inductance of the main inductor LM.

Figure 14:
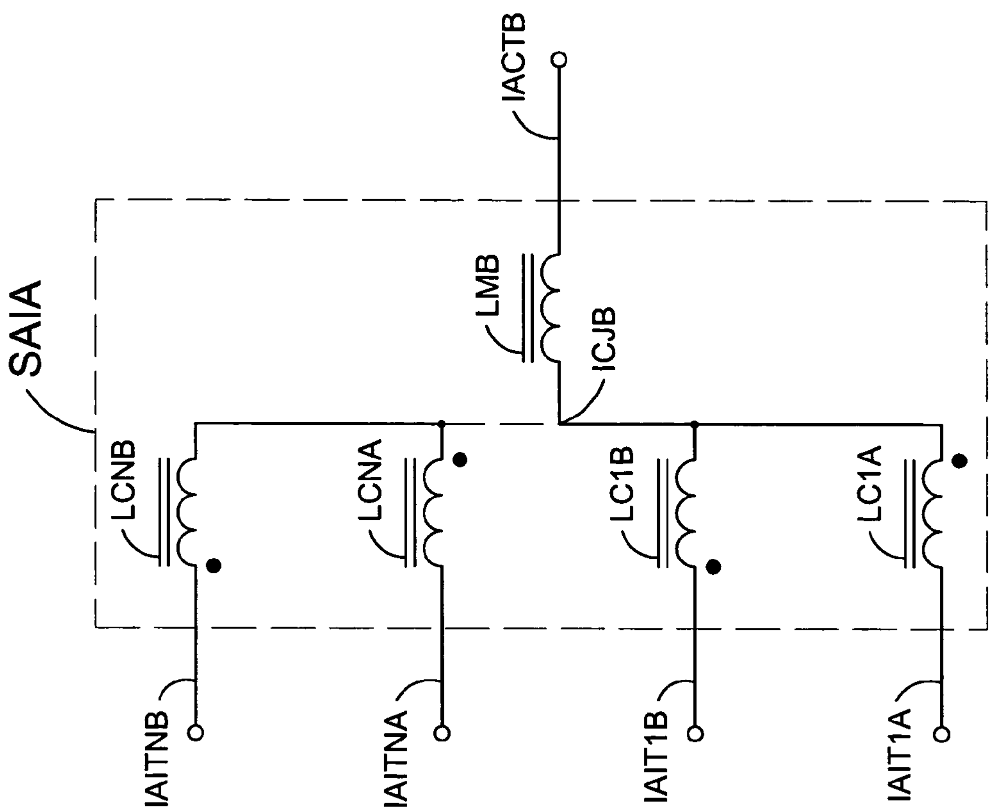

FIG. 14 shows an inductor assembly SAIA that has N pairs of commutation inductors connected in a series-aiding coupling arrangement. One inductor is connected between each inductor assembly input terminal IAIT1A . . . IAITNA, IAIT1B . . . IAITNB and an inductor common junction ICJB. When more than two windings are used in this type of inductor assembly they must come in pairs, and the switching sequence must be ordered so that every successive switching assembly in the sequence is connected to a winding of opposite polarity. The two simplest ways of implementing the coupled commutation inductors LC1A–LC1B . . . LCNA–LCNB are to wrap the windings around the center leg of an E-core set, or to wrap them around the same side of a C-core set. Each pair of commutation inductor windings is preferably tightly coupled (coupling coefficient of at least 0.9). The inductances of the commutation inductor windings are preferably nearly equal. The inductance between a pair of inductor assembly input terminals approaches four times the inductance of one winding for tightly coupled windings that are connected in a series-aiding arrangement. The common connection between each pair of windings is connected to a main converter inductor LMB at an inductor common junction ICJB.

The peak energy stored in each of the commutation inductors LC1 . . . LCN of FIG. 13 is slightly less than the total peak energy stored in each pair of the coupled commutation inductors IC1A–IC1B . . . ICNA-ICNB of FIG. 14 when the inductances between their corresponding input terminals are the same, the operating conditions are the same, and the peak reverse-recovery currents of the diodes are minimal in comparison to diode forward currents. Thus, the size of the coupled commutation inductors of FIG. 14 can be significantly smaller than the combined size an equal number of the discrete commutation inductors of FIG. 13. For equivalent inductor assemblies and equivalent operating conditions, there will be slightly more peak energy stored in the main inductor LM of FIG. 13 in comparison with the corresponding main inductor LMB of FIG. 14 because the total peak energy storage for the two configurations must be equal. This minor increased energy storage requirement for LM, however, has a negligible effect on its physical size.

Figure 15:
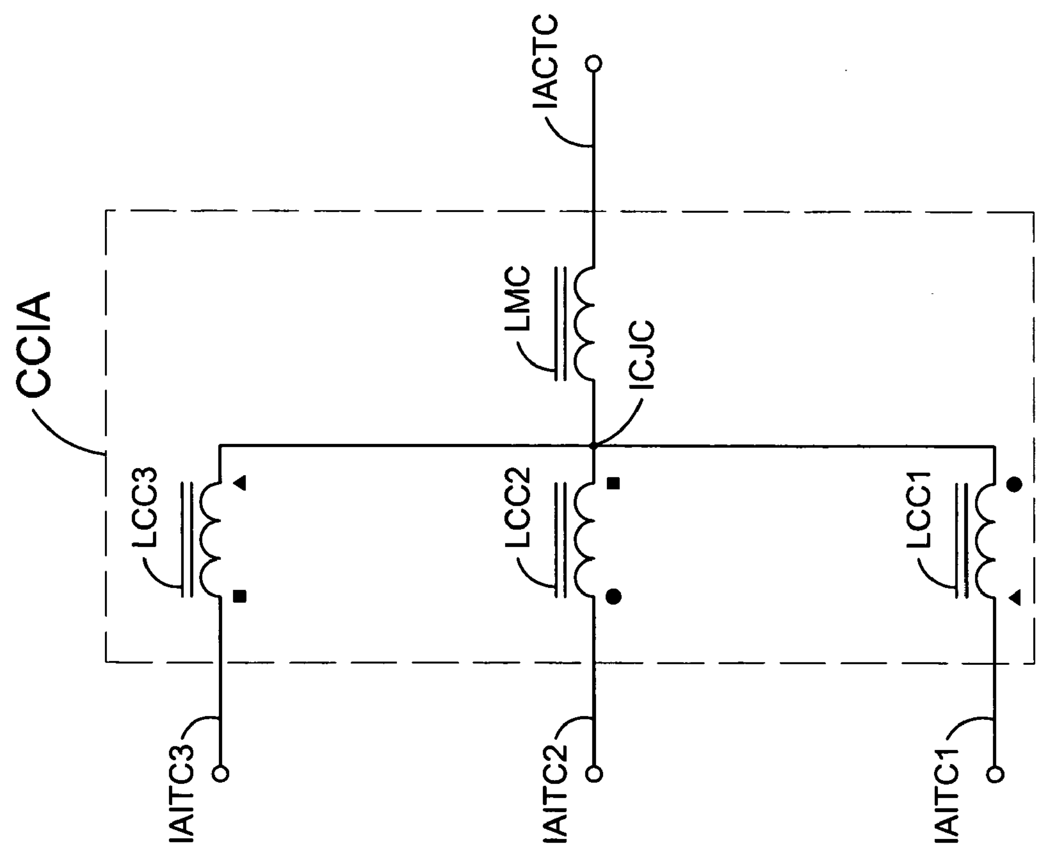

FIG. 15 shows an inductor assembly implementation CCIA that has three coupled commutation inductors LLC1 . . . LLC3 that are intended to be driven by three switching assemblies. The commutation inductors could be implemented with three windings wound around three legs of a core similar to what is used in three-phase transformers. The magnitude of the coupling between each winding pair must be less than 0.5, so the relative size reduction possible with this configuration in comparison with three discrete inductors of FIG. 13 will generally be less than the relative size reduction possible for two tightly coupled windings of FIG. 14 in comparison with two discrete inductors of FIG. 13. One commutation inductor is connected to between each inductor assembly input terminal IAICT1 . . . IAICT3 and junction ICJC. A main inductor LMC is connected between junction ICJC and the inductor assembly common terminal IACTC.

Figure 16:
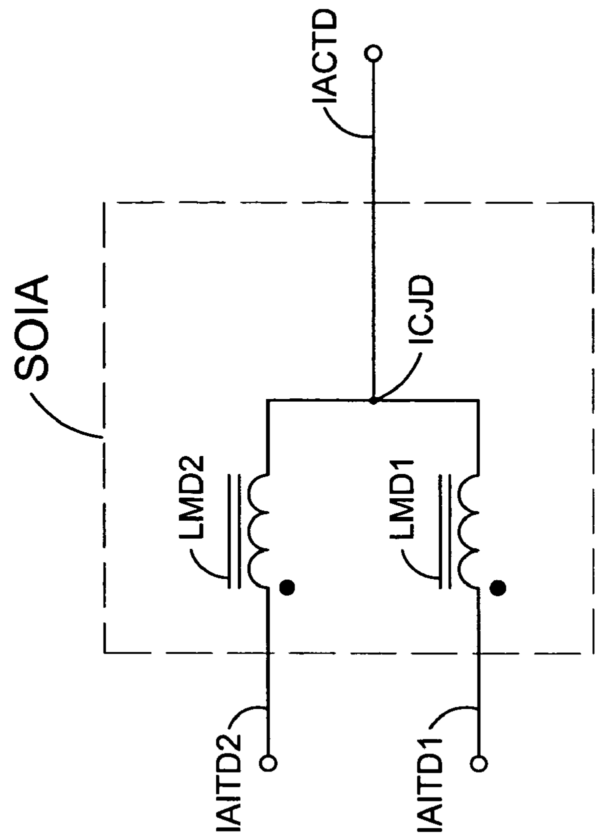

FIG. 16 shows an inductor assembly SOIA in which two main inductor windings LMD1 and LMD2 are wound on a common core structure with a series-opposing coupling arrangement. There are no commutation inductors, but the diode commutation effect still occurs due to the leakage inductance between the to windings. The inductances between inductor assembly input terminals IAITD1 and IAITD2 and inductor assembly common terminal IACTD are preferably equal, and the inductance between the inductor assembly input terminals is preferably less than one fifth of the inductance between an input terminal and the common terminal IACT. These constraints imply that the coupling coefficient is at least 0.9. The copper utilization for the inductance assemblies of FIG. 16 is not as good as for those of FIGS. 13–15 because the currents in the main windings are discontinuous. The configuration shown in FIG. 14 with one pair of windings is the preferred embodiment of the inductor assembly.

The previously described preferred values of the ratios between inductance values in the various implementations of inductor assembly IA are derived from typical diode commutation times and typical ripple current levels in the main inductors, and therefore they are merely guidelines for illustration, and not primary design constraints.

Figure 4:
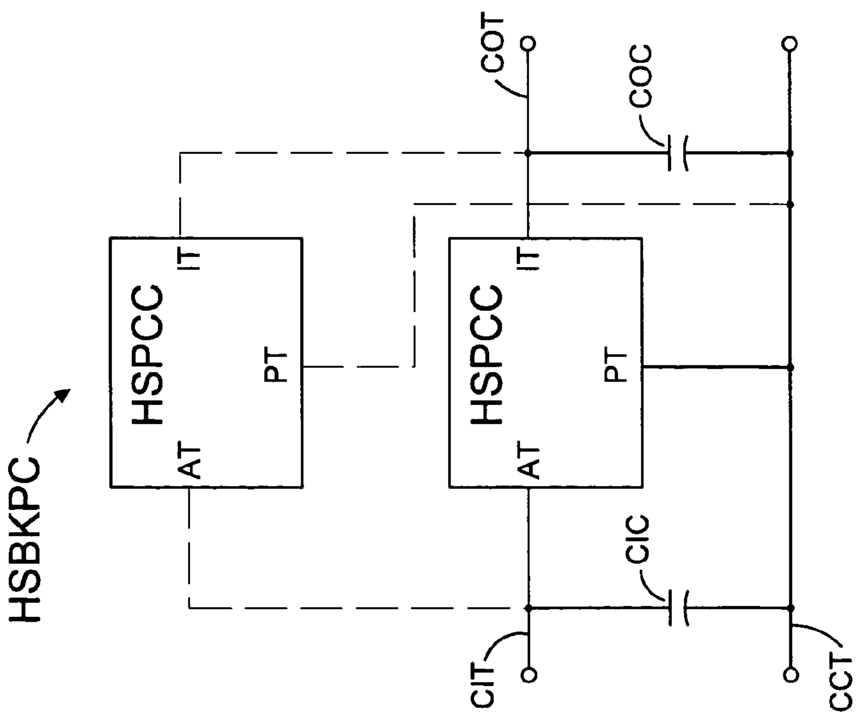
FIGS. 4–6 illustrate, respectively, prior art hard-switched buck, buck-boost and boost power converters.
Figure 5:
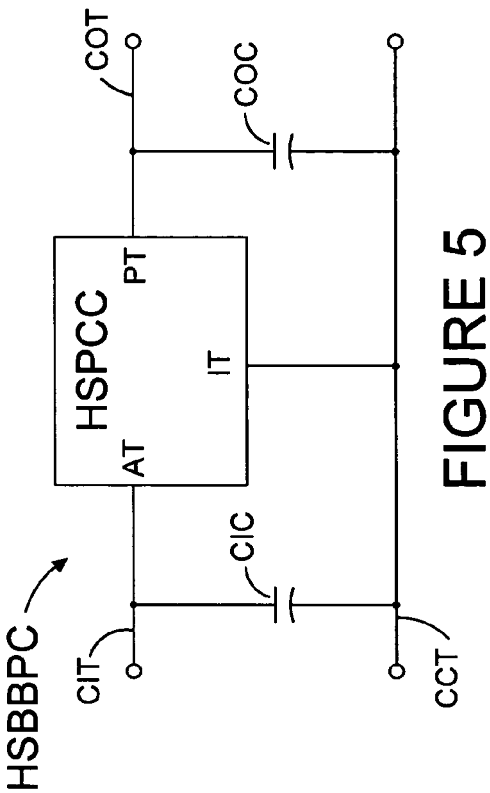
Figure 6:
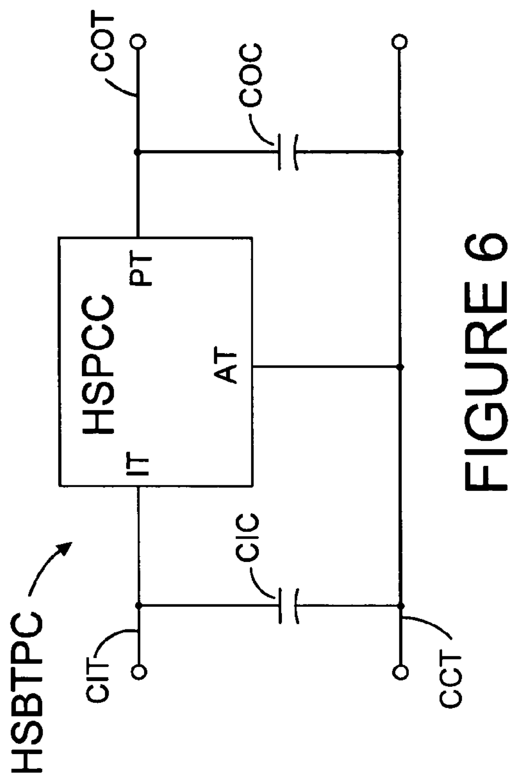
Figure 17:
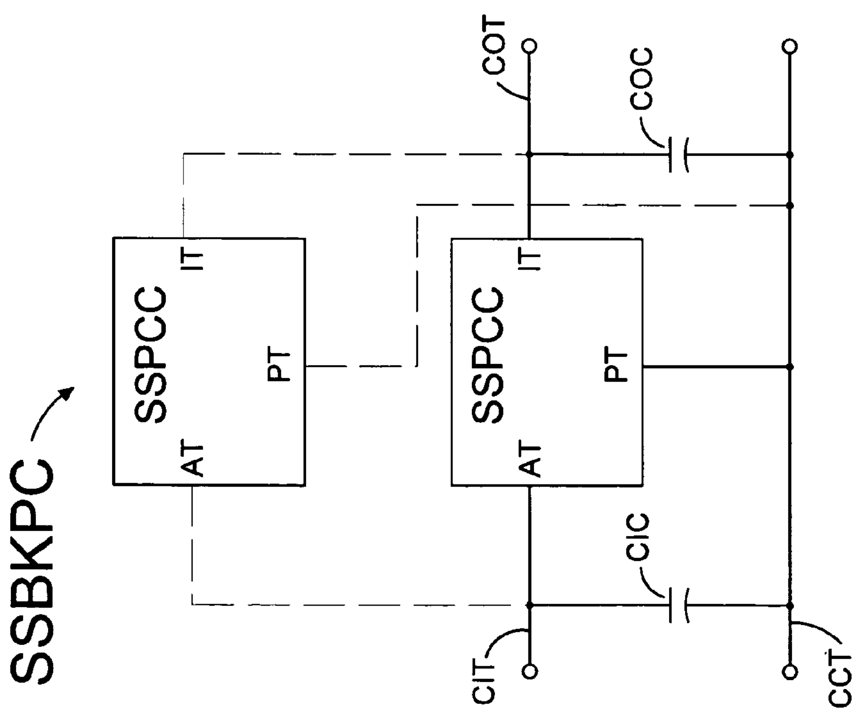
FIGS. 17–19 illustrate, respectively, soft-switched buck, buck-boost and boost power converters.
Figure 18:
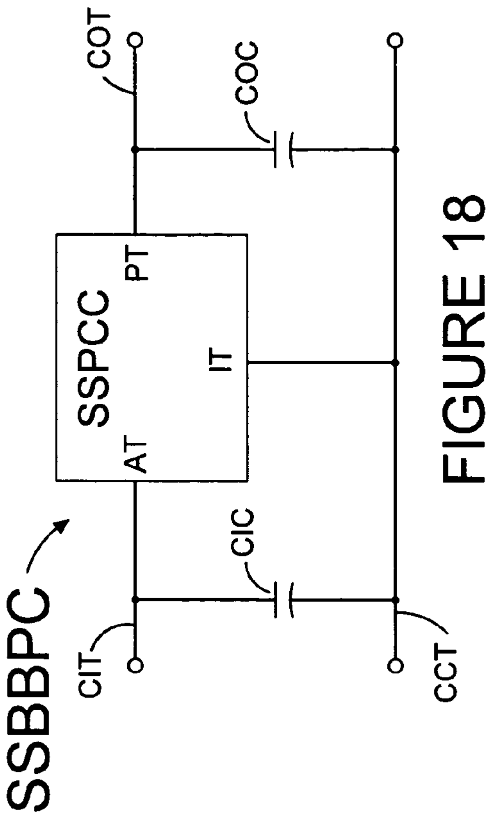
Figure 19:
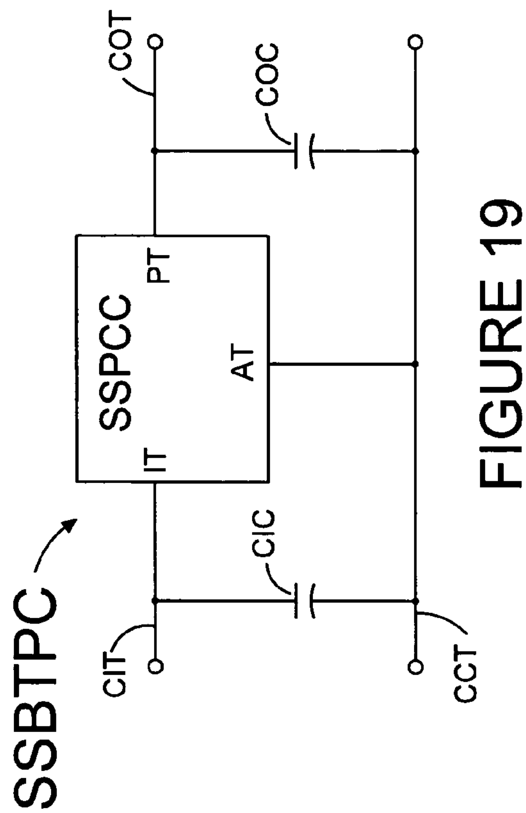

FIGS. 17–19 illustrate, respectively, a soft-switched buck power converter SSBKPC, a buck-boost power converter SSBBPC, and a boost power converter SSBTPC. These power converters utilize soft-switched power converter cells (implementations of SSPCC of FIG. 12) instead of the hard-switched power converter cells that are used in the prior art power converters of FIGS. 4–6. The orientations of the soft-switched power converter cells in soft-switched power converters and their polarities are the same as is described above for the hard-switched power converters.

Figure 1:
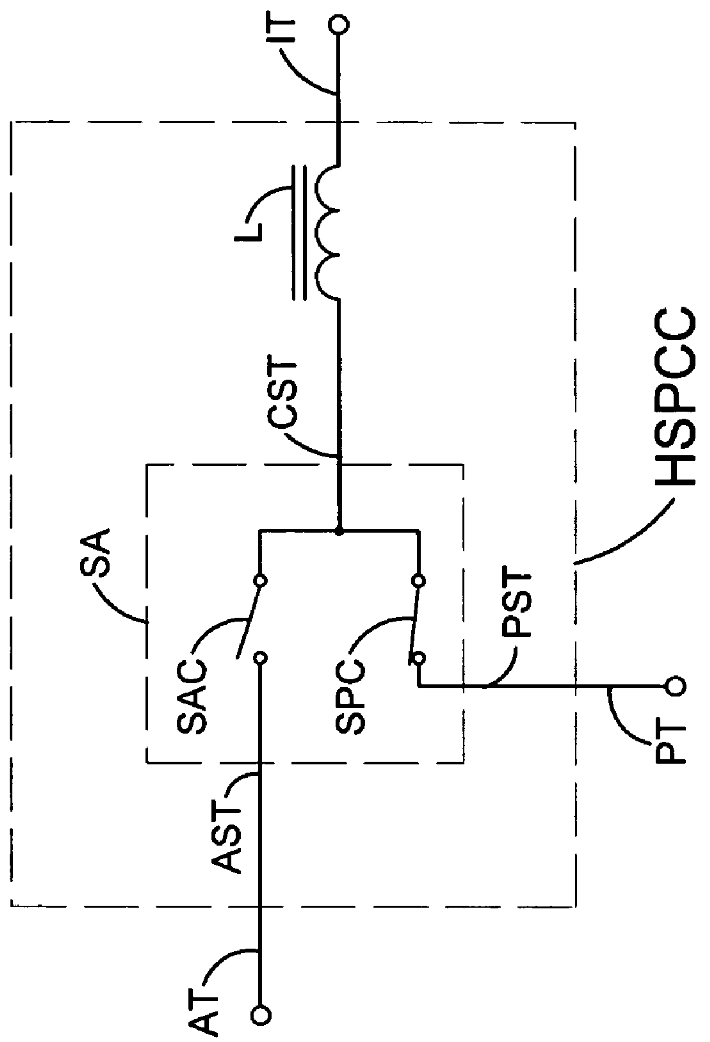
FIG. 1 illustrates a prior art hard-switched power converter cell.
Figure 3:
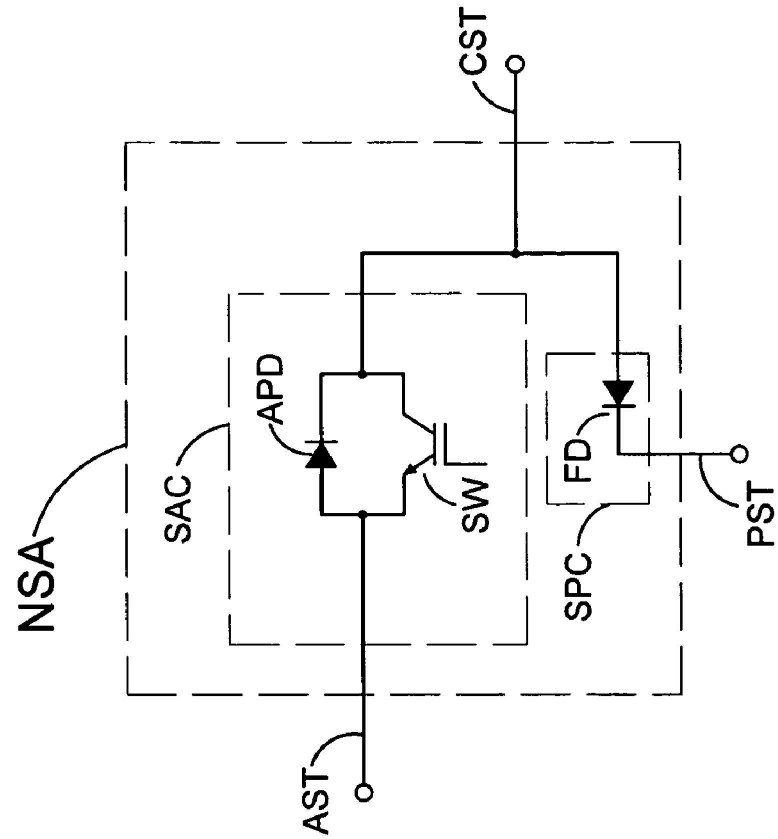
FIGS. 2 and 3 illustrate, respectively, prior art positive and negative switching assemblies.
Figure 2:
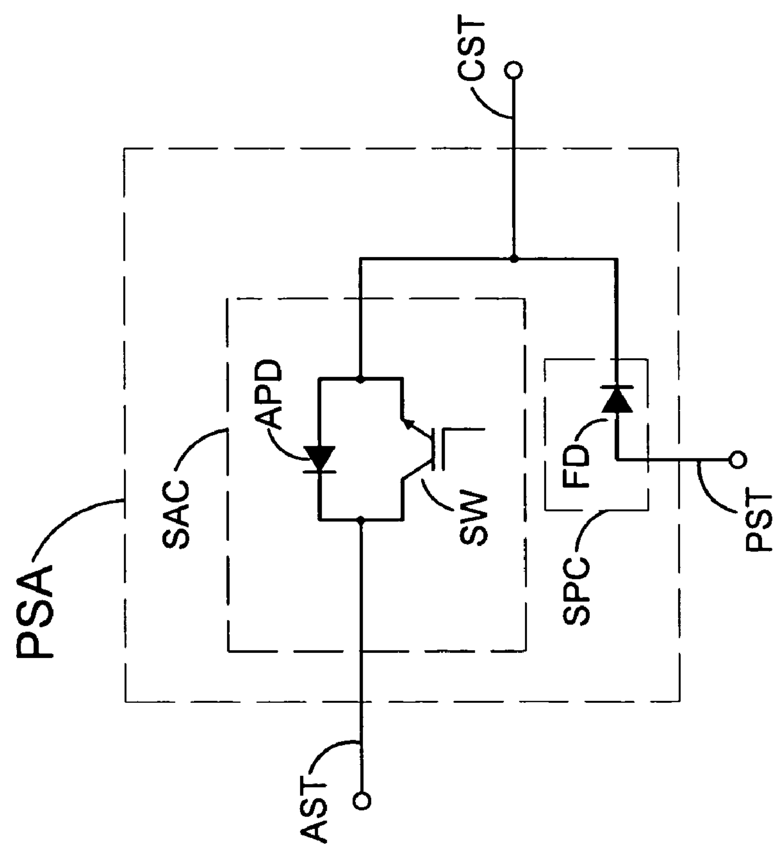
Figure 20:
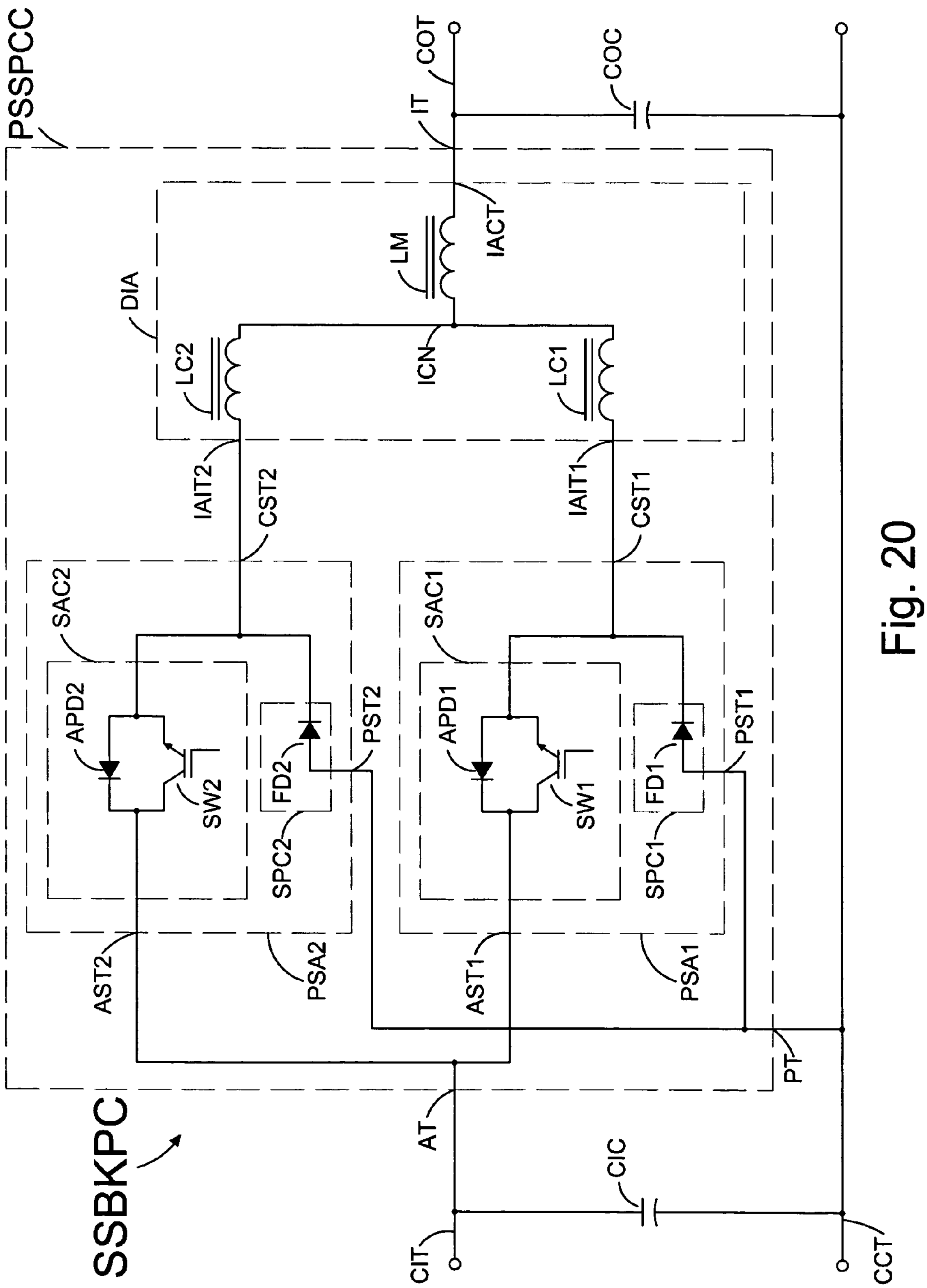
FIG. 20 illustrates a soft switching interleaved buck power converter.
Figure 25:
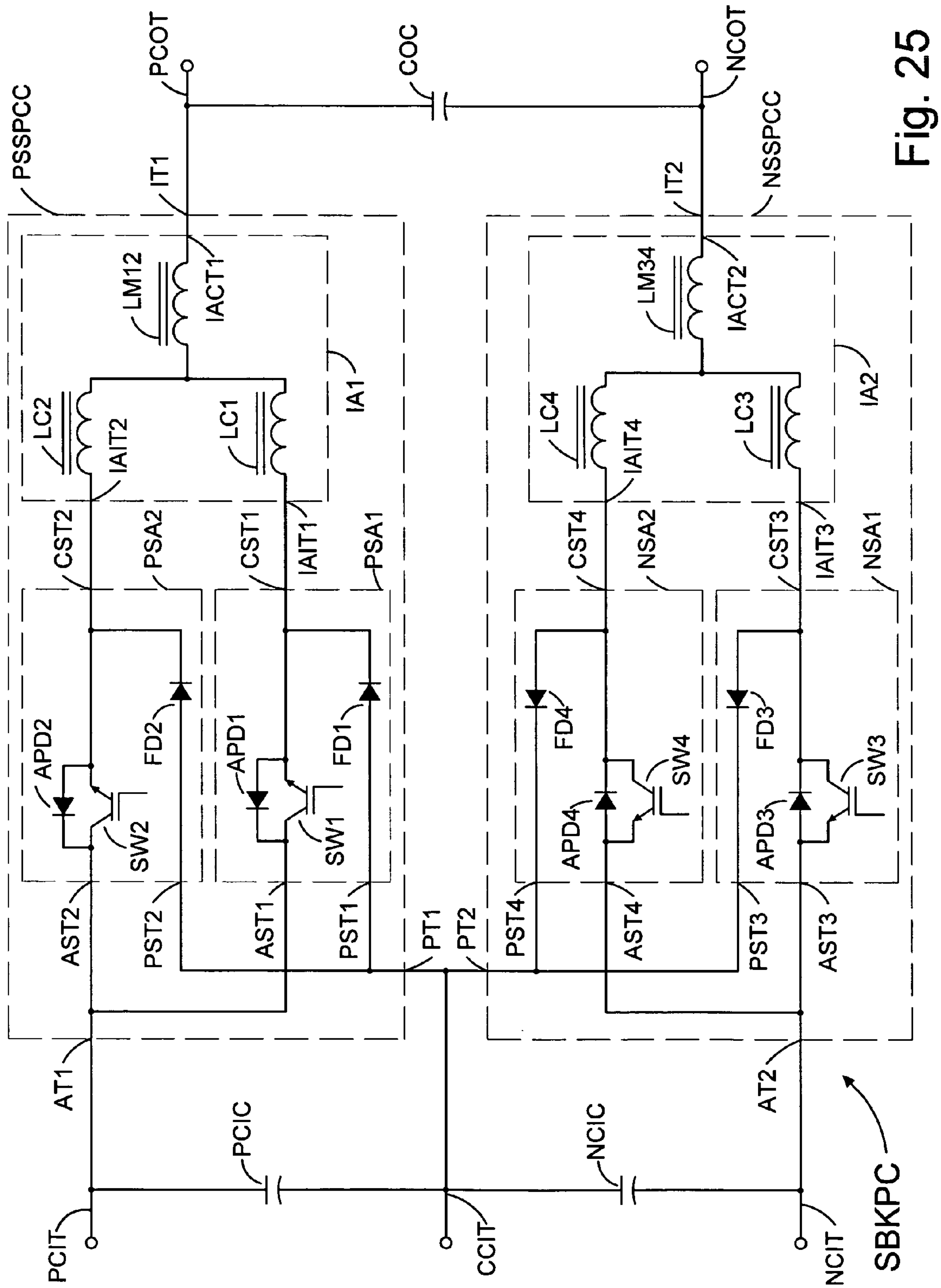
FIG. 25 provides a detailed diagram of the soft-switched stacked buck power converter of FIG. 22.

FIG. 20 illustrates an implementation of the soft-switched buck power converter SSBKPC of FIG. 17 that has a positive soft-switched power converter cell PSSPCC with two positive switch assemblies PSA1 and PSA2 that are constructed as illustrated in FIG. 2. (In contrast, NSSPCC in FIG. 25 is a negative soft-switched power converter cell.) The inductor assembly IA is the type shown in FIG. 13, and has two discrete commutation inductors LC1 and LC2, and a main inductor LM. Additional commutation inductors and switching assemblies may be connected as shown in FIG. 13, with N switching assemblies preferably operated with an interleaving phase angle difference of 360°/N. The inductances of the commutation inductors are preferably equal. The preferred embodiment, however, is when the two commutation inductors are tightly coupled as shown in FIG. 14.

Figure 21:
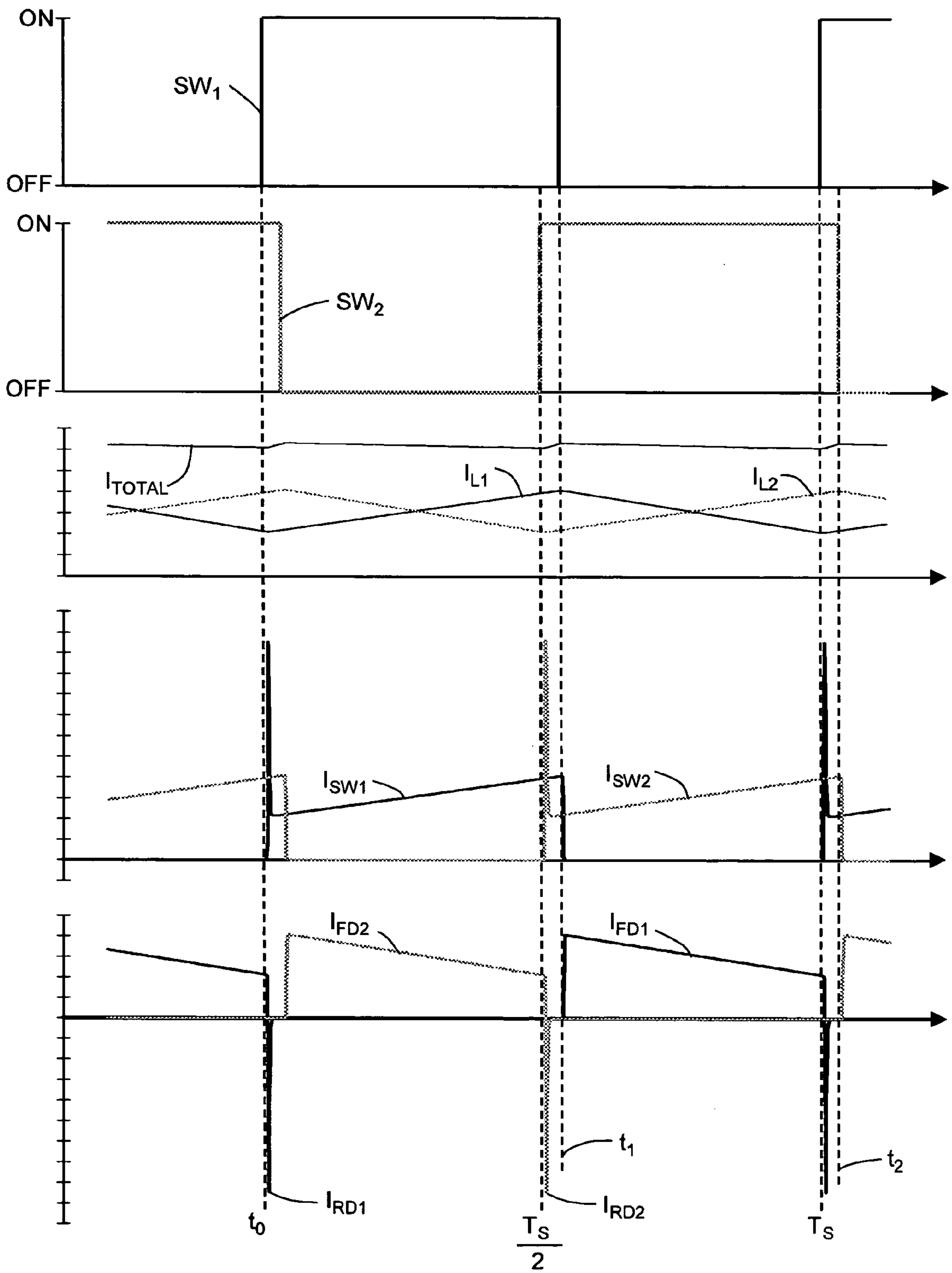
FIG. 21 illustrates waveforms of the soft-switched buck power converter of FIG. 20.

FIG. 21 illustrates waveforms of the soft switching buck power converter SSBKPC in FIG. 20. The waveforms were obtained from a computer simulation with the following characteristics: input voltage $V_{in}$=750 VDC, output voltage $V_{out}$=400 VDC, output current $I_{out}$=62.5 A, switching period $T_s$=64 μs, 600 μH main inductor, two discrete 20 μH commutation inductors, and a 10 μF converter output capacitor. The current waveform plots of FIG. 21 have vertical scales of 10 A per division.

Figure 8:
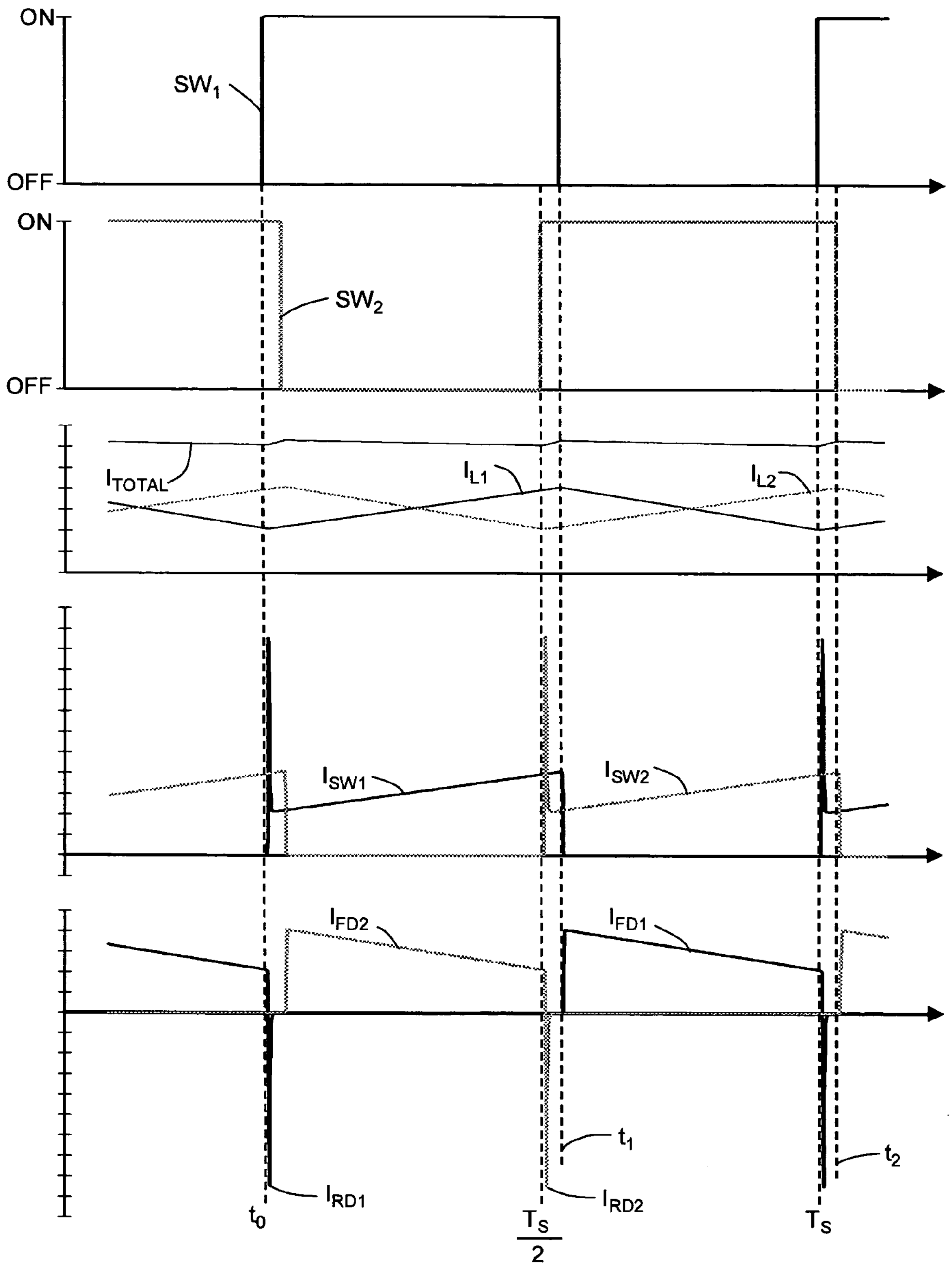
FIG. 8 illustrates waveforms of the prior art hard switching power converter of FIG. 7.
Figure 9:
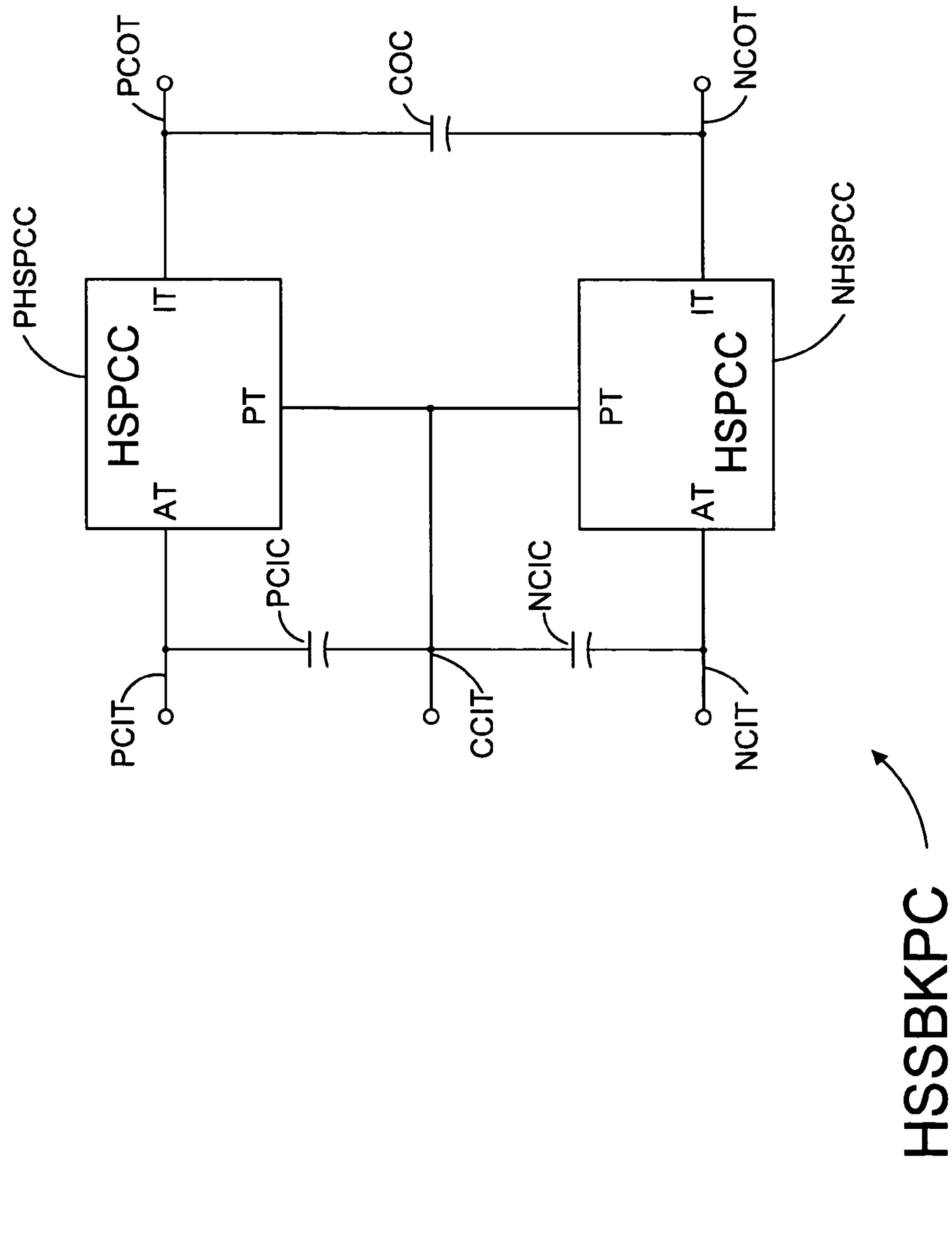
FIGS. 9–11 illustrate, respectively, prior art hard-switched stacked buck, stacked buck-boost and stacked boost power converters.
Figure 10:
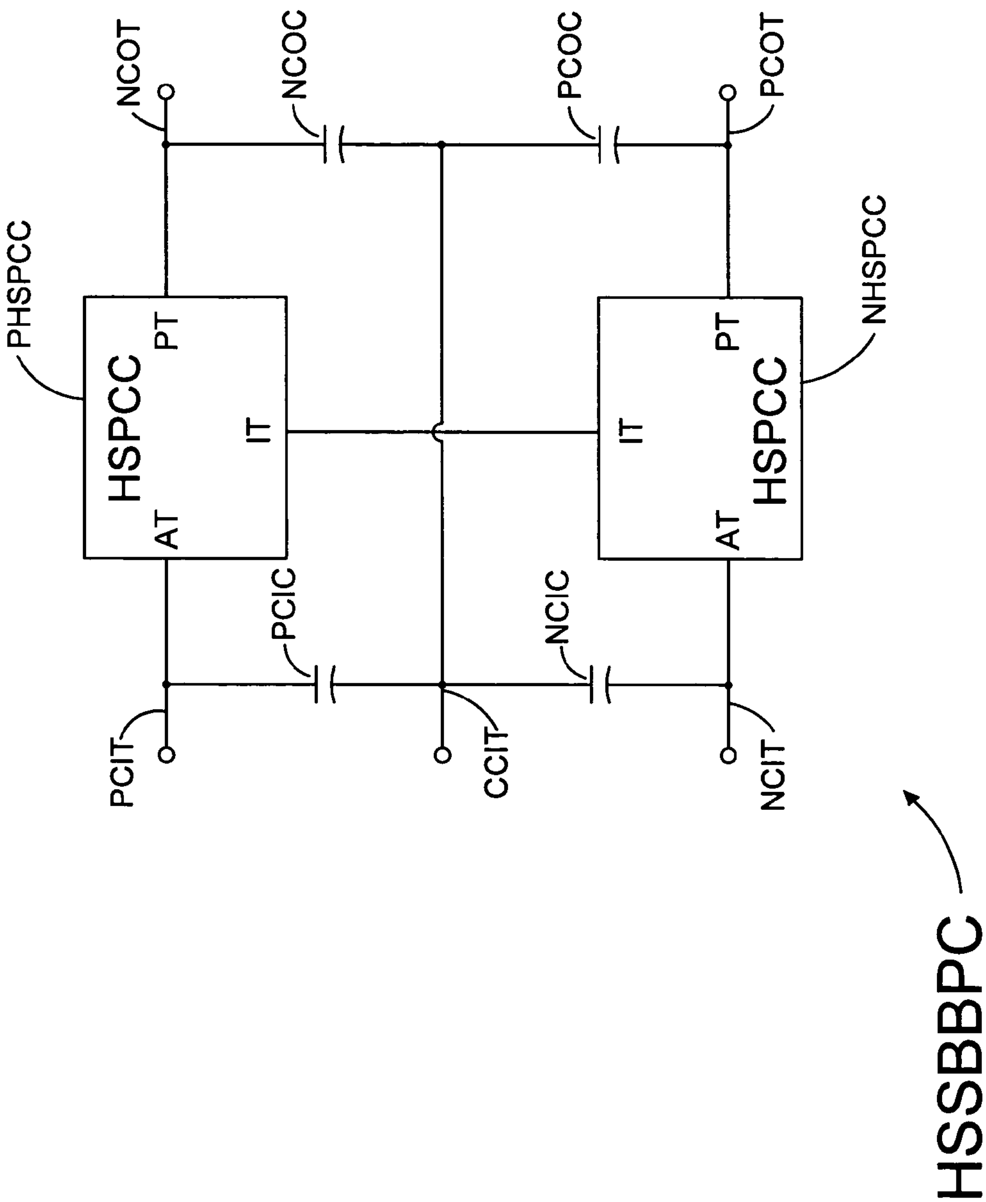
Figure 11:
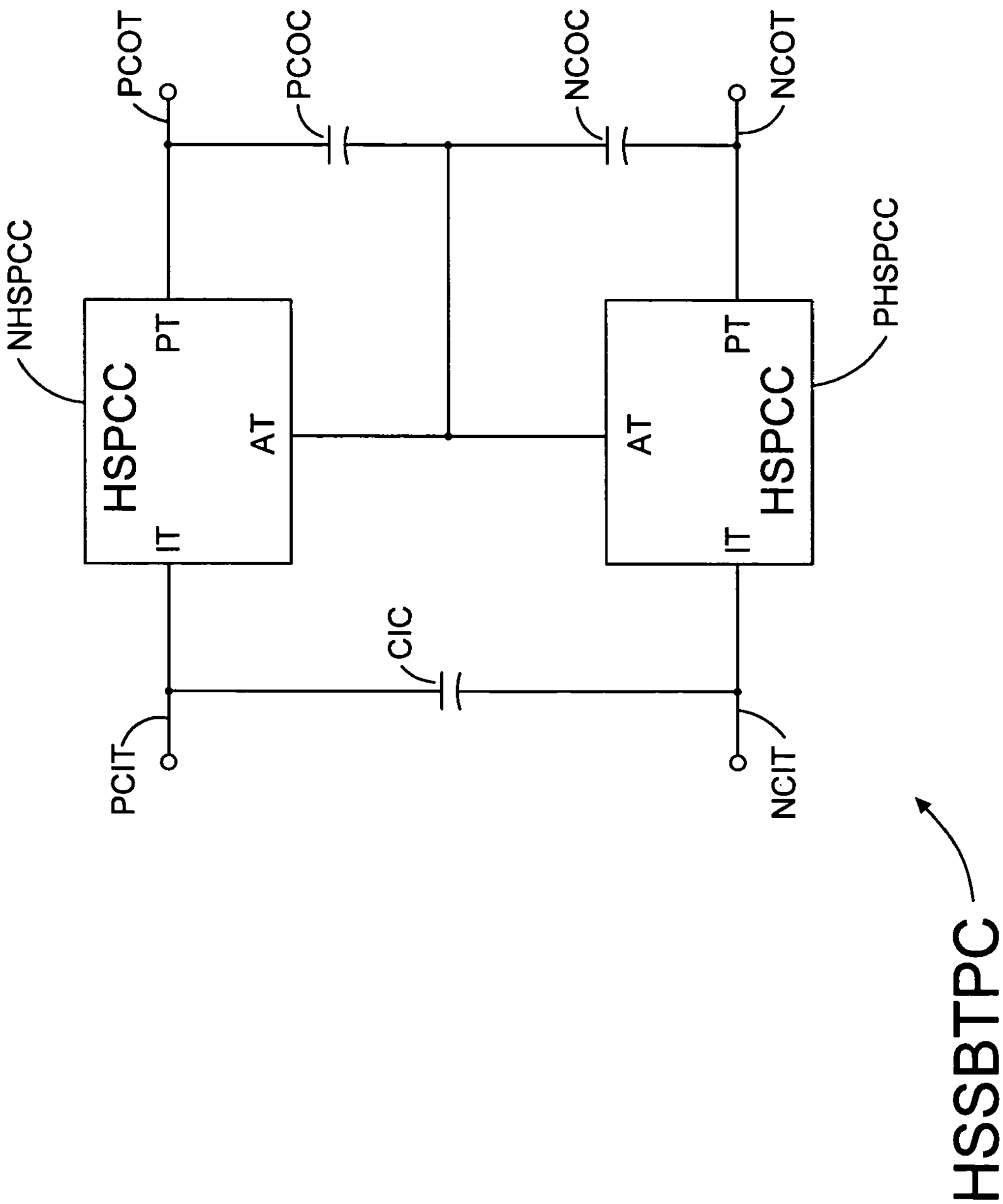

As with the simulation that produced the waveforms of FIG. 8, the capacitance of COC used in this simulation was selected so that the output ripple voltage was negligible, but much smaller capacitors can be used with converters that are intended to operate loads where high-frequency ripple is not critical, such as typical dc plasma loads. Having low output capacitance is desirable for plasma loads because this reduces the energy that may be delivered to arcs. The SSPCC was supplied by an ideal voltage source in the simulation, so the converter input capacitor was not required.

The voltage between common switch terminal CST 1 and passive switch terminal PST1 is labeled as $V_{CP1}$, and the voltage between CST2 and PST2 is labeled as $V_{CP2}$. The current through freewheeling diode FD1, $I_{FD1}$, is very small when switch SW1 is turned on at time $t_0$, so the peak reverse-recovery current $I_{RD1}$ of FD1 is also very small. At time $t_0$, the current through FD2, $I_{FD2}$, is equal to the current through LC2, and slightly less than the main inductor current, $I_{LM}$. After SW1 turns on, the current through it ramps up as the current in FD2 ramps down. The slope of the current transition in amperes/second is equal to $V_{in}/L_{ii}$, where $L_{ii}$=LC1+LC2. The same type of current transition takes place for the currents in SW2 and FD2 following the time $T_s/2$.

The current through commutation inductor LC2 reverses as FD2 is being turned off, and when FD2 finally turns off, this current causes the voltage at CST2 to ring up until anti-parallel diode APD2 conducts. The voltage at CST1 rings down immediately after SW1 turns off at time $t_1$, and FD1 then begins to conduct, picking up the main inductor current. APD2 turns off with a small reverse-recovery current shortly after SW1 turns off, and the voltage at CST2 rings down until FD2 begins to conduct due to the small current flowing in LC2. SW2 turns on at time $T_s/2$, and because there is little, if any, current flowing through FD2 at that time, SW2 turns on without a large current spike, just as SW1 did at time $t_0$.

The soft switching characteristics of the soft-switched power converter cells of the present invention provide power savings in the switches and diodes that allow converter circuits using these cells to operate at higher frequencies than with circuits that use prior art hard-switched power converter cells. Operating at higher frequencies allows the inductor and capacitor values to be reduced, and this reduces physical size and cost. Higher frequency operation also enables improvements in the transient response of the converters and reduces the energy available for delivery to plasma arcs.

Figure 7:
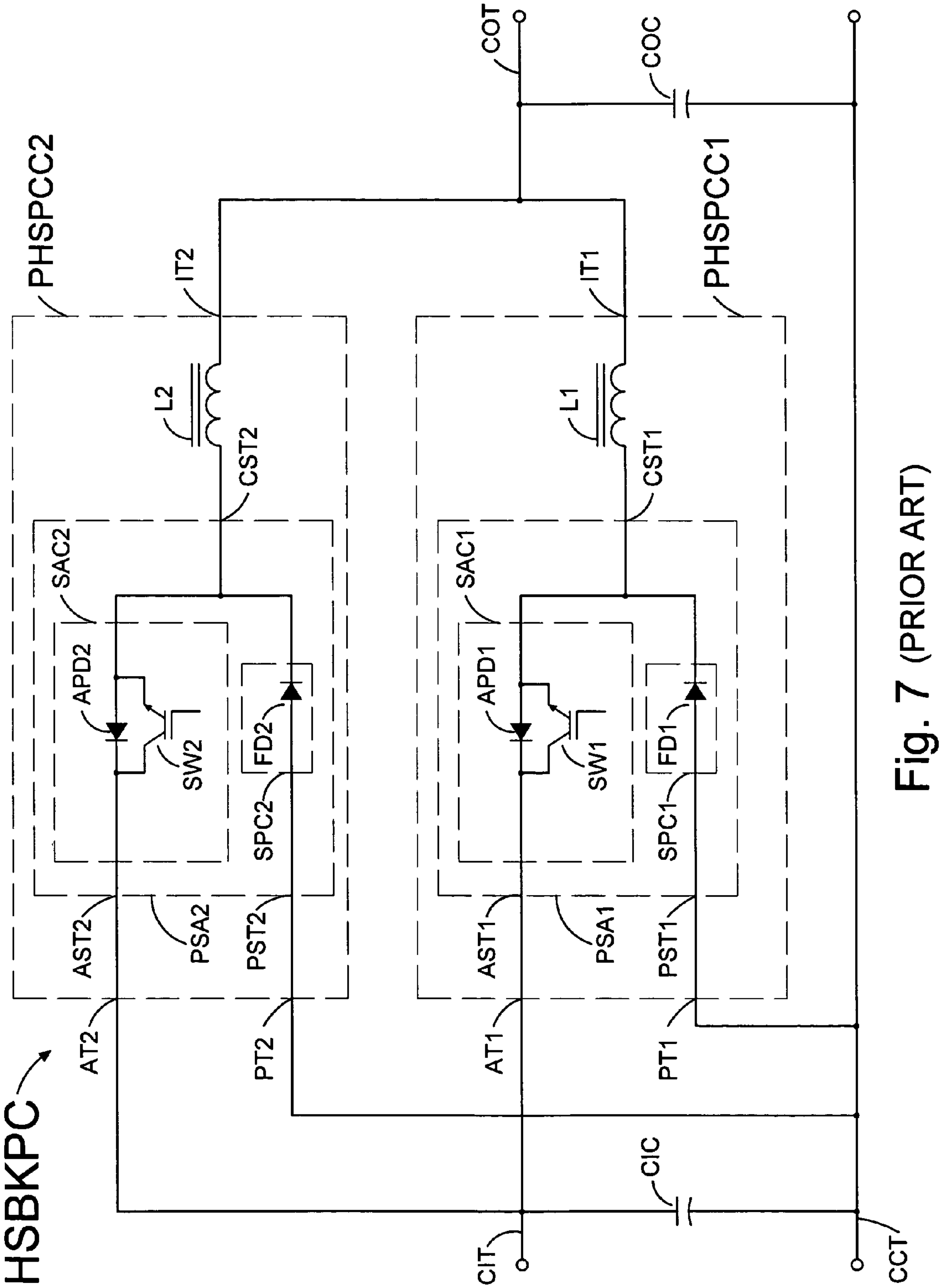
FIG. 7 illustrates a prior art hard switching interleaved buck power converter.

In hard-switched power converters, the diode current is very rapidly reversed from the forward conduction mode to the reverse conduction mode. The waveforms of FIG. 21, however, illustrate that during the commutation intervals of the soft switching power converter cell PSSPCC following $t_0$ and $T_s/2$, the diode current drops at a relatively slow rate of about 19 A/μs, which allows significant recombination to occur in the diode junction before the diode current is reversed. Consequently, the peak reverse-recovery currents $I_{RD1}$ and $I_{RD2}$ are low (about one-fifth of the output current), and this produces low diode turn-off losses and low turn-on losses for the switches. In contrast, FIG. 8 illustrates that the diode currents in the hard-switched power converter cell PHSPCC of FIG. 7 drop at a rate of about nearly 1000 A/μs, resulting in a large peak reverse-recovery currents $I_{RD1}$ and $I_{RD2}$ that are 35 percent greater than the output current. This produces high diode turn-off losses and high turn-on losses for the switches. The optimal current reduction slope for typical high voltage power diodes ranges from about 20 A/μs to 100 A/μs. The optimal reverse-recovery and commutation times may decrease as diode technologies are improved.

The time required to bring the diode current to zero, $T_z$, is approximately equal to $I_{out}L_{ii}/V_{in}$, where $L_{ii}$=LC1+LC2. The total commutation time, $T_{ct}$, is equal the sum of $T_z$ and the reverse-recovery time of the freewheeling diodes FD, $t_{rrf}$. In FIG. 21, the diode current reaches zero in about 3 μs, and, the diode reverse-recovery time $t_{rrf}$ is about 1 μs. The total commutation time, $T_{ct}$, is therefore about 4 μs, which is one-sixteenth of the 64 μs switching period, $T_s$.

The voltage conversion ratio M of a power converter cell is defined as the steady-state ratio of the average voltage between the inductive and passive terminals, $V_{ip}$, divided by the average voltage between the active and passive terminals, $V_{ap}$. In hard-switched power converter cells operating in continuous conduction mode, the conversion ratio is ideally (with lossless components) equal to the duty ratio, D, of the SAC switches: $M=V_{ip}/V_{ap}=D$. Thus, the ideal steady-state voltage conversion ratio $V_{out}/V_{in}$ of hard-switched power converters operating in continuous conduction mode is only a function of the duty cycle, and is independent of the converter output current. The voltage conversion ratio is nearly equal to the ideal value in high-voltage hard-switched power converters.

In contrast, the voltage conversion ratio M for soft-switched power converter cells of the present invention operating in continuous conduction mode is reduced as the output current increases, even with ideal components, because of the effects of the total commutation time $T_{ct}$, and the reverse-recovery time of the anti-parallel diodes $T_{rra}$ on the average terminal—terminal voltages of the converter cell. In the soft-switched power converter cell PSSPCC of FIG. 20, the voltage between junction ICJ and the passive terminal PT is equal to half of the voltage between the active an passive terminals during the commutation interval $T_{ct}$ and also during the reverse-recovery interval $T_{rra}$ of the anti-parallel diodes. Consequently, the ideal value of M for a soft-switched power converter cell SSPCC, which has N sets of switch assemblies is equal to: $M=V_{ip}/V_{ap}=N\cdot[D-0.5(T_{ct}+T_{rra})/T_s]$ when the power converter cell is operating in continuous conduction mode, and the sum of $T_{ct}$ and $T_{rra}$ is less than the duration of the conduction intervals of the SAC switches, $D\cdot T_s$. Soft switching is lost when the sum of $T_{ct}$ and $T_{rra}$ reaches the duration of the conduction intervals of the SAC switches. The ideal value of M is never less than N·D/2 when the power converter is operating in continuous conduction mode.

Because both $T_{ct}+T_{rra}$ are directly related to the output current, the output voltage of a buck power converter BKPC (which is proportional to M) will droop as the output current is increased. For example, with the soft-switched buck power converter SSBKPC of FIG. 20 operating with a duty cycle D=0.25, the maximum output voltage at light loads is half of the input voltage, but the output voltage drops to one-fourth of the input voltage at heavy loads when the sum of $T_{ct}$ and $T_{rra}$ equals or exceeds the duration of the conduction intervals of the SAC switches, $D\cdot T_s$.

The maximum duty cycle of the switches is preferably 1/N. Increasing the duty cycle beyond this does not increase the conversion ratio M, and causes the soft-switching effect to be lost. In contrast, the duty cycle of the switches in the prior art hard-switched interleaved buck converter of FIG. 7 must use the full 0 to 1 duty cycle range to cover the full output voltage range when the inductors are operating in continuous conduction mode.

The total commutation time is preferably less than one-tenth of $T_s$ for buck power converters BKPC that must achieved output voltages close to the input voltage when fully loaded. Longer commutation times may be acceptable for situations in which the ability of the converter to deliver power is not unduly affected. The fact that M is a function of the output current creates a damping effect in the transient response of the power converter may sometimes be useful. For example, when a soft-switched buck power converter SSBKPC is used to supply a plasma load that has a negative incremental impedance, this effect may help stabilize the power supply because it increases the output impedance of the power converter.

Figure 26:
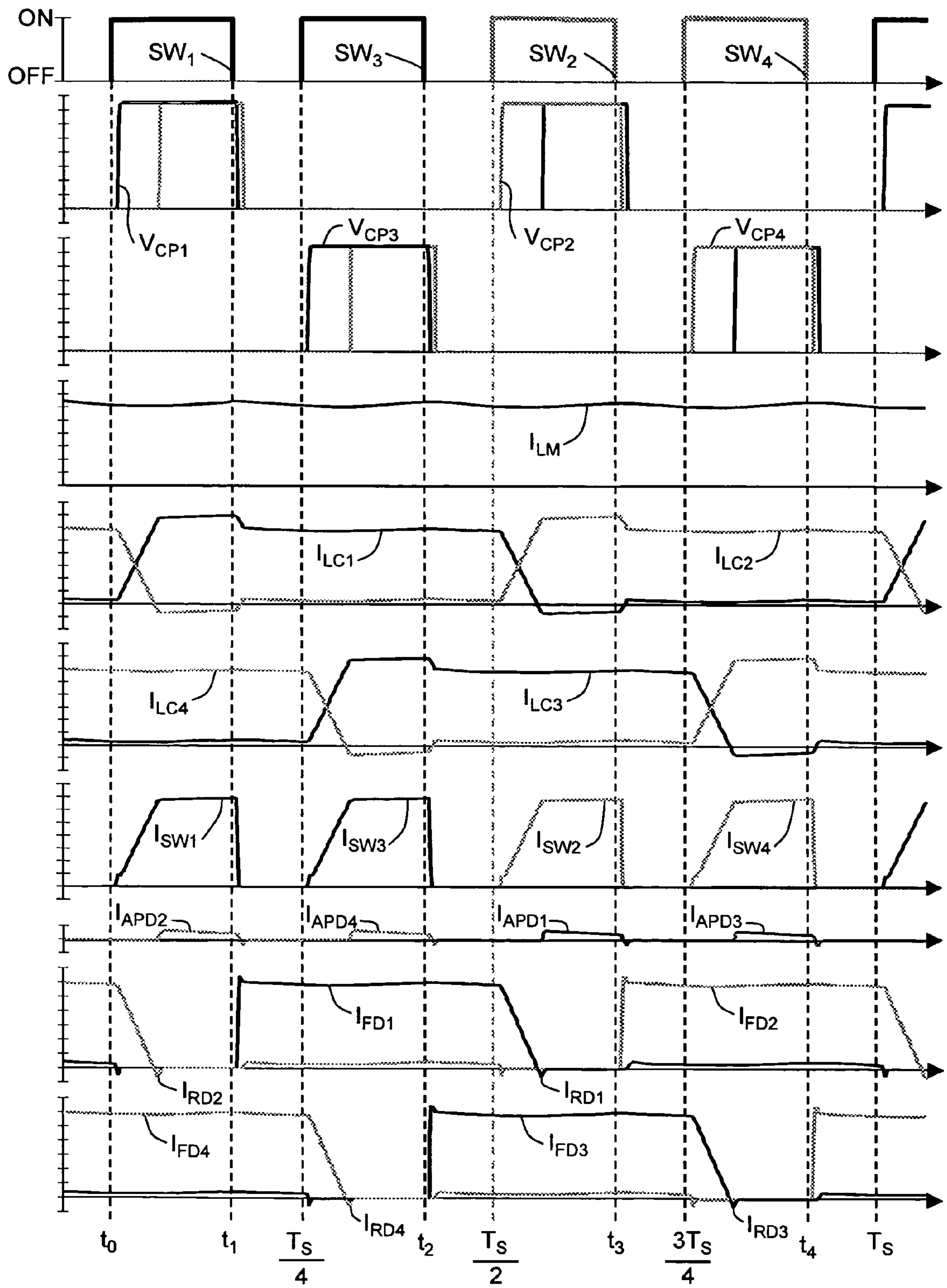
FIG. 26 illustrates waveforms of the power converter of FIG. 25.

Instead of connecting more than two switching assemblies to one inductor assembly, it is preferable to operate two or more soft switching power converter cells SSPCC of the same polarity in parallel as shown in FIG. 17, with interleaved switching between the converter cells. The switching pattern of two interleaved soft switching power converter cells is shown in FIG. 26, which illustrates the waveforms of the stacked buck converter SBKPC of FIG. 25. When two soft-switched buck power converter cells are stacked in that way, however, they must be of opposite polarities. When two interleaved soft-switched power converter cells are operated in parallel they will have the ripple cancellation effect that occurs in prior art interleaved converters such as the one in FIG. 7. The combined current of the two inductors in FIG. 7, $I_{total}$, has much less ripple than the current in each inductor. The ripple cancellation effect is illustrated in the inductor current waveforms of FIG. 8, but it is lacking in the inductor waveforms of FIG. 21 because the power converter of FIG. 20 is not interleaved.

Implementing the buck-boost and boost converters of FIGS. 18 and 19 with the soft-switched power converter cells of the present invention provides the same type of performance improvements that are afforded to the buck converter, and the switching waveforms have the same shapes as those in FIG. 20.

Figure 22:
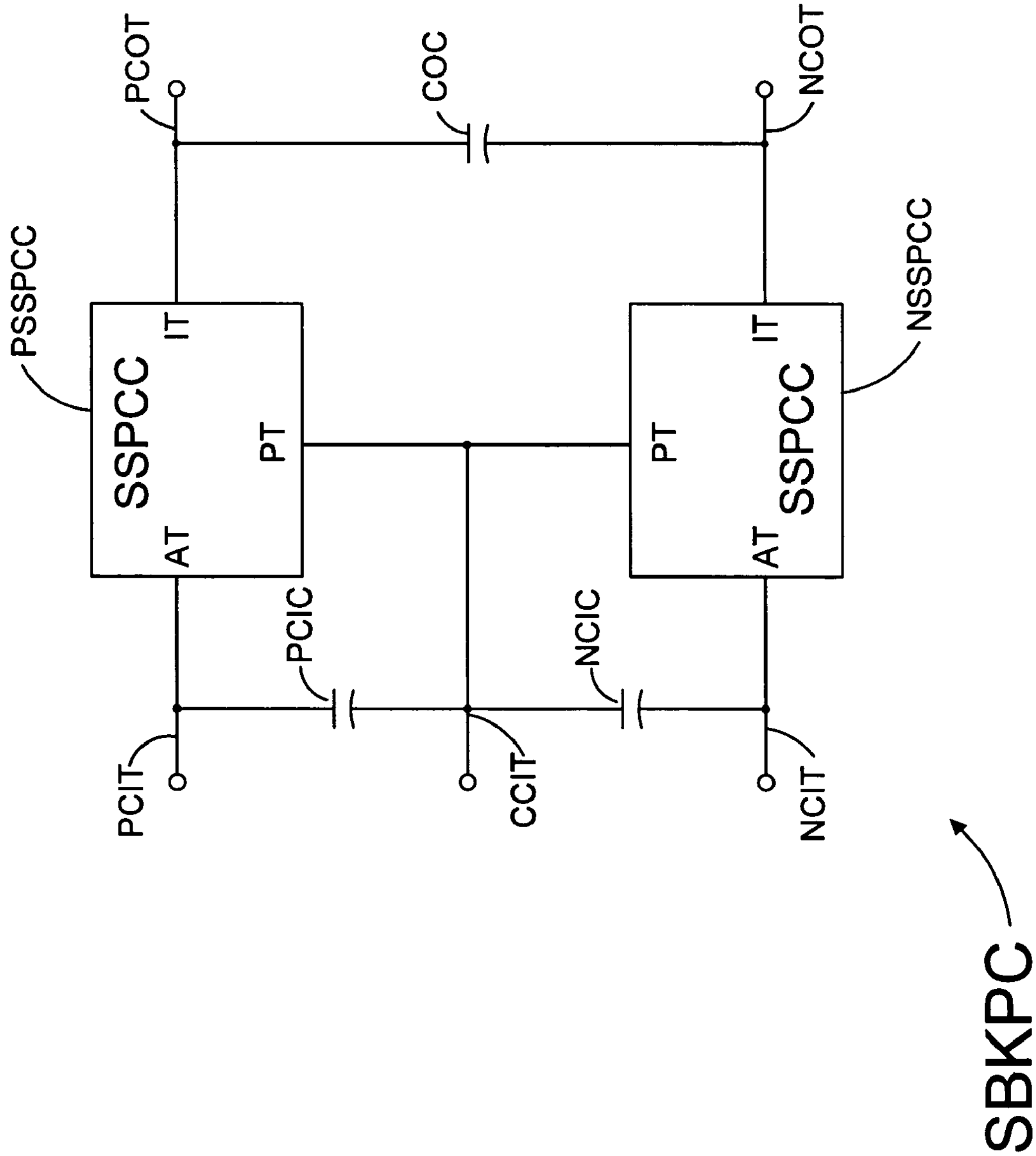
FIG. 22 illustrates a soft-switched stacked buck power converter.
Figure 23:
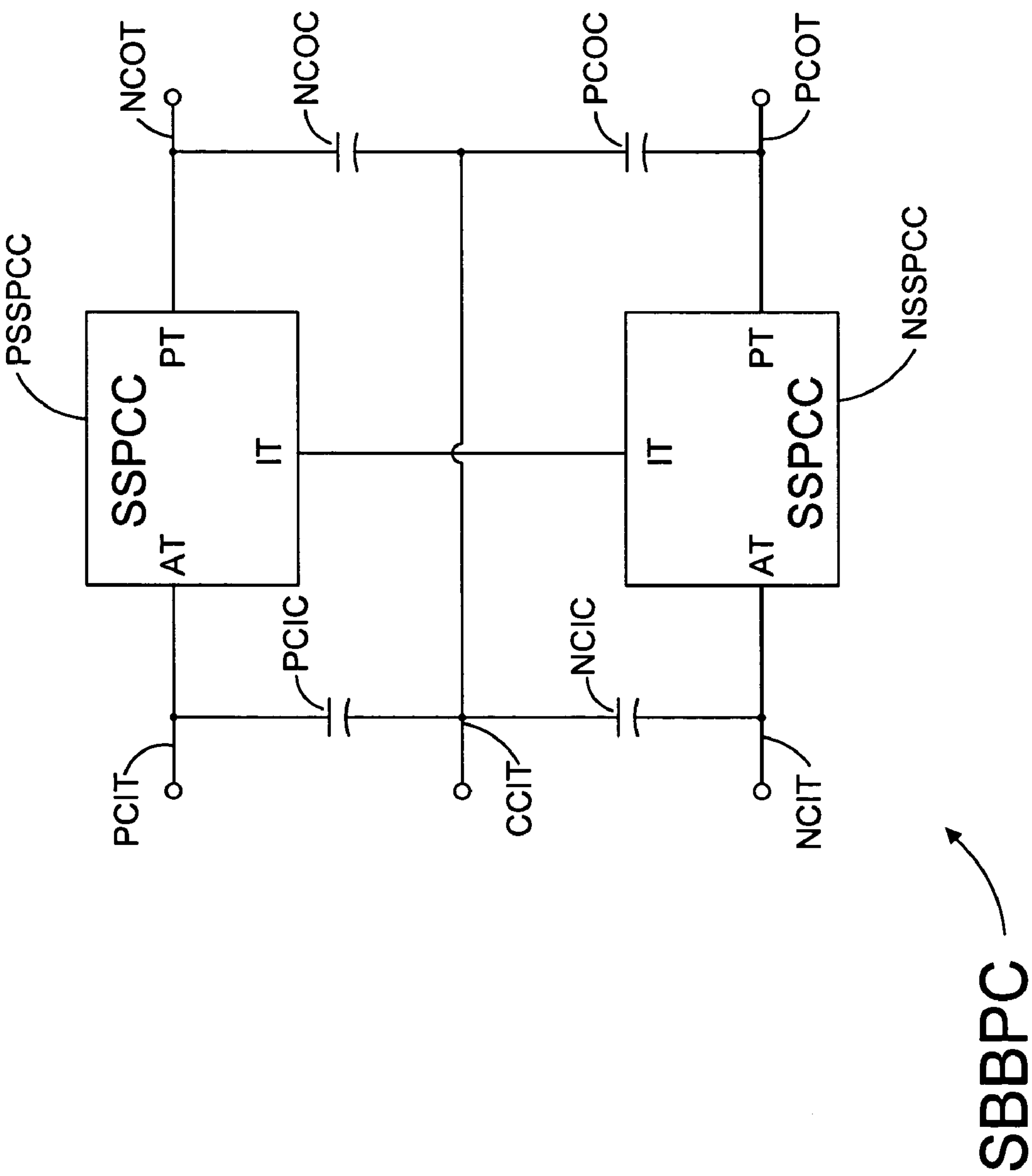
FIG. 23 illustrates a soft-switched stacked buck-boost power converter.
Figure 24:
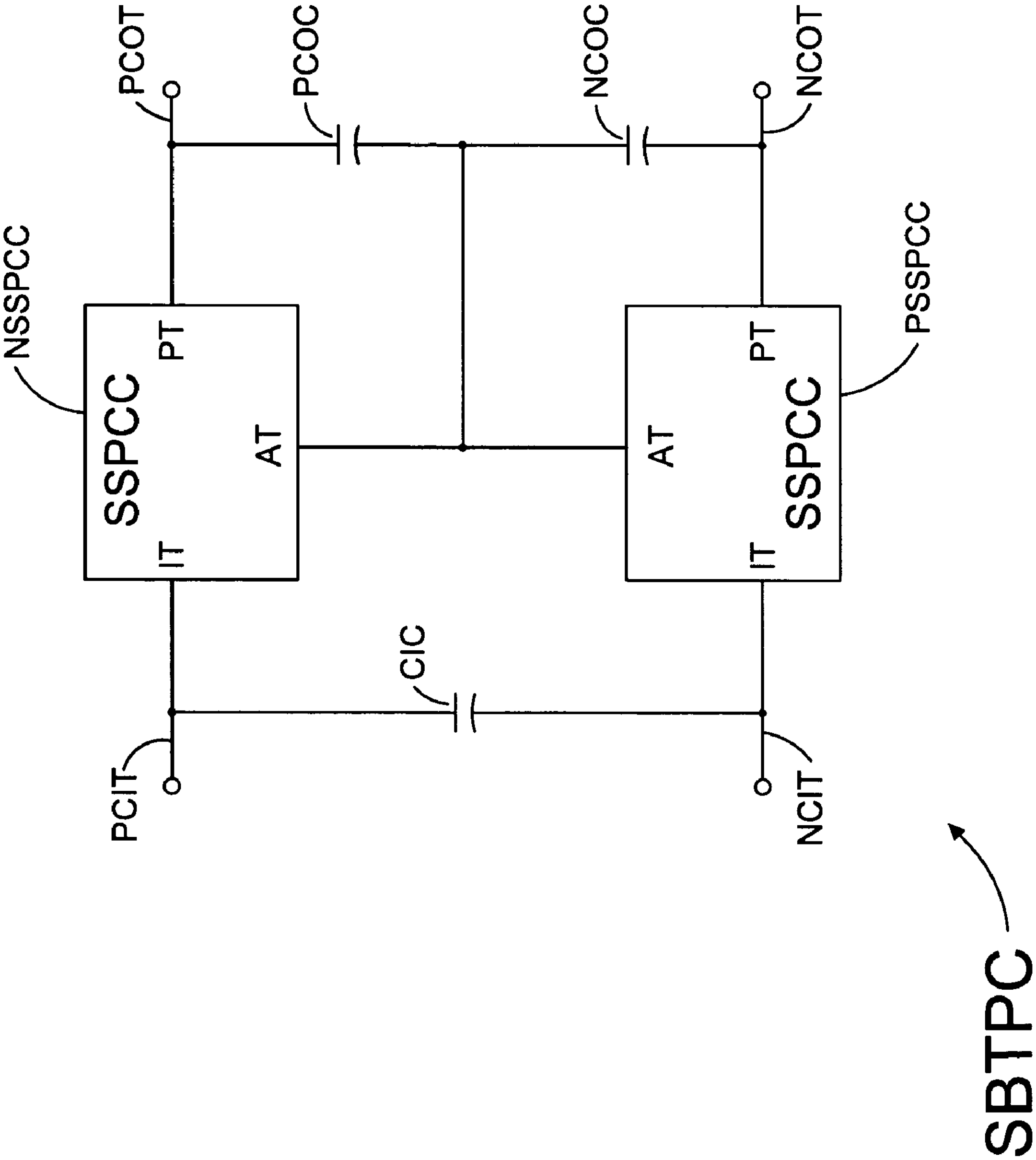
FIG. 24 illustrates a soft-switched stacked boost power converter.

FIGS. 22–24 show how to connect two soft-switched power converter cells to form, respectively, a soft-switched stacked buck power converter SBKPC, a soft-switched stacked buck-boost power converter SBBKPC, and a soft-switched stacked boost power converter SBTPC. These circuits allow the input and output voltages to be twice what they could be for single power converters with the same voltage ratings for the switches and diodes. They are particularly useful for power supplies that operate plasma loads because high output voltages are usually required. The stacked power converters have positive and negative power converter input terminals PCIT and NCIT, and positive and negative power converter output terminals PCOT and NCOT.

In the soft-switched stacked buck power converter SBKPC of FIG. 22, a positive soft-switched power converter cell PSSPCC is connected between a positive input terminal PCIT and an intermediate terminal CCIT. A negative soft-switched power converter cell NSSPCC is connected between CCIT and the negative input terminal NCIT. The two power converter cells are preferably operated in an interleaved manner. The SBKPC can receive power from two stacked power supplies that have a common connection at terminal CCIT. It the switching duty cycles of the two power converter cells are balanced, one power supply may be connected between PCIT and NCIT, with CCIT left floating. This also applies to the soft-switched stacked buck-boost power converter SBBPC of FIG. 23.

FIG. 26 illustrates waveforms for the soft-switched stacked buck converter SBKPC of FIG. 25. Each soft-switching power converter cells is shown with two switching assemblies per inductor assembly, but they could be implemented with N switching assemblies, where N is greater than 1. As with the soft switching buck power converter BKPC of FIG. 15, the maximum duty cycle of the switches is preferably 1/N. The switches in each soft-switched stacked power converter cell are preferably operated with an interleaving phase angle difference of 360°/N, while the switching patterns of the two cells are also preferably interleaved, which gives an effective interleaving phase angle difference between two stacked power converter cells PPCC of 180°/N. The inductances of the commutation inductors are preferably equal.

The voltages between junctions CST1 through CST4 and CCIT are respectively illustrated as waveforms $V_{CP1}$ through $V_{CP4}$. The waveforms for each power converter cell are essentially the same as those for FIG. 20, except that the ripple current in the main inductors, $I_{LM}$ is reduced because of the interleaving between the two power converter cells. As is shown in FIG. 26, the ripple current frequency in LM12 and LM34 is twice the switching frequency of the switches. This is similar to the ripple canceling effect that occurs with parallel-connected interleaved power converter cells, but it has the advantage that both of the inductors have reduced ripple currents instead of just having cancellation in the sum of the two main inductor currents. With two parallel-connected interleaved power converters, the ripple in the sum of the main inductor ripple currents is almost totally cancelled when the switch duty cycles are 50 percent. With stacked interleaved power converters, the ripple currents in the main inductors are almost totally cancelled when the switch duty cycles are 25 percent.

The waveforms were obtained from a computer simulation with the following characteristics: input voltage $V_{in}$=750 VDC between PCIT and CCIT, and between CCIT and NCIT (1500 VDC total), output voltage $V_{out}$=400 VDC, output current $I_{out}$=62.5 A, switching period $T_s$=64 μs, 300 μH main inductors, two discrete 20 μH commutation inductors per inductor assembly, and a 10 μF converter output capacitor. The SBKPC was supplied by two ideal voltage sources so the converter input capacitors PCIC and NCIC were not required.

As with the simulations that produced the waveforms of FIGS. 8 and 21, the capacitance of COC used in the simulation was selected so that the output ripple voltage was negligible, but much smaller capacitors can be used with converters that are intended to operate loads where high-frequency ripple is not critical, such as typical dc plasma loads. Having low output capacitance is desirable for plasma loads because this reduces the energy that may be delivered to arcs. The SBKPC of FIG. 25 can be used to implement the dc power supply described in the co-pending patent application: Apparatus and Method For Fast Arc Extinction With Early Shunting of Arc Current in Plasma, Ser. No. 10/884,119 filed Jul. 2, 2004.

Implementing the soft-switched stacked buck-boost and boost power converters of FIGS. 23 and 24 with soft-switched power converter cells PSSPCC and NSSPCC provides the same type of performance improvements that are afforded to the soft-switched stacked buck power converter, and the switching waveforms have the same shapes as those in FIG. 26.

In the stacked buck power converter SBPPC, of FIG. 25, it can be seen that the main inductors LM12 and LM34 are effectively connected in series with the converter output capacitor COC. Consequently, one of these main inductors could be eliminated, but it is preferable to have both main inductors because they can reduce electromagnetic noise interference (EMI) problems by providing significant high frequency impedance between the switching devices and the load. Similarly, the main inductor could be eliminated from one of the power converter cells in the stacked power converters of FIGS. 23 and 24, but it is preferable to have both main inductors. The main inductors of the stacked soft-switch power converters preferably have essentially the same inductance, and if they do, they may be wound on a common core with the coupling polarities oriented in a series-aiding manner. For example, the soft switching buck power converter SBKPC of FIG. 22 can be implemented with LM12 and LM34 being wound on a common core, and with the windings oriented so that the terminals connected to IT1 and IT2 have opposite polarities.

Although there is illustrated and described specific structure and details of operation, it is clearly understood that the same were merely for purposes of illustration and that changes and modifications may be readily made therein by those skilled in the art without departing from the spirit and the scope of this invention.

We claim:

1. A soft switching interleaved power converter comprising:

a) a converter input terminal, a converter output terminal and a converter common terminal, wherein power is received between the converter input terminal and the converter common terminal, and an output current is delivered to a load connected between the converter output terminal and the converter common terminal;

b) a soft switching power converter cell having an active terminal, a passive terminal and an inductive terminal, with these three terminals each being connected to one of the three said converter terminals; the soft switching power converter cell having an inductor assembly and at least two switch assemblies;

c) each switch assembly having an active switch terminal, a passive switch terminal and a common switch terminal;

d) the inductor assembly having a separate inductor assembly input terminal connected to one of each said common switch terminals, and an inductor assembly common terminal connected to said inductive terminal of the soft switching power converter, cell the inductor assembly having an input—input inductance value between a pair of inductor assembly input terminals that is less than the inductance between any inductor assembly input terminal and the inductor assembly common terminal; and e) each switch assembly having a switch connected between the active switch terminal and the common switch terminal, and a diode connected between the passive switch terminal and the common switch terminal, the switches being operated in an interleaved manner so that the action of a switch in a switch assembly being turned on during a switch conduction interval causes a diode in another of said switch assemblies to be subsequently turned off during a commutation interval, each diode having a having a peak forward operating current, and a peak reverse-recovery current as it is being turned off.

2. A soft switching interleaved power converter as recited in claim 1 wherein said input—input inductance values of said inductor assembly are selected such that the magnitudes of said peak reverse-recovery currents of the diodes are substantially less than the magnitudes of said peak forward operating currents.

3. A soft switching stacked interleaved power converter comprising:

a) a positive converter input terminal, negative converter input terminal, a positive converter output terminal and a negative converter output terminal, wherein power is received between the positive converter input terminal and the negative converter input terminal, and an output current is delivered to a load connected between the positive converter output terminal and the negative converter output terminal;

b) a positive soft switching power converter cell having an active terminal, a passive terminal and an inductive terminal, one of these three terminals being connected to a converter input terminal, and the second of these three terminals connected to a converter output terminal;

c) a negative soft switching power converter cell having an active terminal, a passive terminal and an inductive terminal, one of these three terminals being connected to a converter input terminal, and the second of these three terminals connected to a converter output terminal;

d) the third of the three terminals of said positive soft switching power converter cell connected to the corresponding third terminal of said negative soft switching power converter cell;

e) the positive soft switching power converter cell and the negative soft switching power converter cell each having an inductor assembly and at least two switch assemblies;

f) each switch assembly having an active switch terminal, a passive switch terminal and a common switch terminal;

g) the inductor assembly in each power converter cell having a separate inductor assembly input terminal connected to one of each said common switch terminals within that power converter cell, and an inductor assembly common terminal connected to said inductive terminal of the soft switching power converter cell, the inductor assembly having an input—input inductance value between a pair of inductor assembly input terminals that is less than the inductance between any inductor assembly input terminal and the inductor assembly common terminal; and h) each switch assembly having a switch connected between the active switch terminal and the common switch terminal, and a diode connected between the passive switch terminal and the common switch terminal, the switches being operated in an interleaved manner so that the action of a switch in a switch assembly being turned on for a switch conduction interval causes a diode in another of said switch assemblies to be subsequently turned off during a commutation interval, each diode having a having a peak forward operating current, and a peak reverse-recovery current as it is being turned off.

4. The soft switching interleaved power converter of claim 3 wherein said input—input inductance values of said inductor assemblies are selected such that the magnitudes of said peak reverse-recovery currents of the diodes are substantially less than the magnitude of said peak forward operating currents.

5. The soft switching interleaved power converter of claim 3 wherein the diodes in said switch assemblies of the soft switching positive power converter cell and the diodes in the switch assemblies of the soft switching negative power converter cell are oriented with opposite polarities such that current flows out of the common terminal of the inductor assembly in the positive soft switching positive power converter cell, and current flows into the common terminal of the inductor assembly in the negative soft switching power converter cell.

6. The soft switching interleaved power converter of claim 1 configured to function as a buck converter wherein:

a) the active switch terminal of the soft switching power converter cell is connected to the converter input terminal;

b) the passive switch terminal of the soft switching power converter cell is connected to the converter common terminal; and c) the inductive switch terminal of the soft switching power converter cell is connected to the converter output terminal.

7. The soft switching interleaved power converter of claim 1 configured to function as a buck-boost converter wherein:

a) the active terminal of the soft switching positive power converter cell is connected to the converter input terminal;

b) the passive terminal of the soft switching power converter cell is connected to the converter output terminal; and c) the inductive terminal of the soft switching power converter cell is connected to the converter common terminal.

8. The soft switching interleaved power converter of claim 1 configured to function as a boost converter wherein:

a) the active terminal of the soft switching positive power converter cell is connected to the converter common terminal;

b) the passive terminal of the soft switching power converter cell is connected to the converter output terminal; and c) the inductive terminal of the soft switching power converter cell is connected to the converter input terminal.

9. The soft switching stacked interleaved power converter of claim 3 configured to function as a buck converter wherein:

a) the active terminal of the positive soft switching power converter cell is connected to the positive converter input terminal;

b) the active terminal of the negative soft switching positive power converter cell is connected to the negative converter input terminal;

c) the passive terminal of the positive soft switching power converter cell is connected to the passive terminal of the negative soft switching power converter cell;

d) the inductive terminal of the positive soft switching power converter cell is connected to the positive converter output terminal;

e) the inductive terminal of the negative soft switching power converter cell is connected to the negative converter output terminal.

10. The soft switching stacked interleaved power converter of claim 3 configured to function as a buck-boost converter wherein:

a) the active terminal of the positive soft switching power converter cell is connected to the positive converter input terminal;

b) the active terminal of the negative soft switching positive power converter cell is connected to the negative converter input terminal;

c) the inductive terminal of the positive soft switching power converter cell is connected to the inductive terminal of the negative soft switching power converter cell;

d) the passive terminal of the positive soft switching power converter cell is connected to the positive converter output terminal;

e) the passive terminal of the negative soft switching power converter cell is connected to the negative converter output terminal.

11. The soft switching stacked interleaved power converter of claim 3 configured to function as a boost converter wherein:

a) the inductive terminal of the positive soft switching power converter cell is connected to the positive converter input terminal;

b) the inductive terminal of the negative soft switching positive power converter cell is connected to the negative converter input terminal;

c) the active terminal of the positive soft switching power converter cell is connected to the active terminal of the negative soft switching power converter cell;

d) the passive terminal of the positive soft switching power converter cell is connected to the positive converter output terminal;

e) the passive terminal of the negative soft switching power converter cell is connected to the negative converter output terminal.

12. The soft switching interleaved power converter of claim 1 wherein said commutation interval is less than said switch conduction interval.

13. The soft switching interleaved power converter of claim 3 wherein said commutation interval is less than said switch conduction interval.

14. The soft switching interleaved power converter of claim 1 wherein said inductor assembly comprises at least two commutation inductors, and a main inductor having first and second main inductor terminals; each commutation inductor being connected between a separate inductor assembly input terminal and the first main inductor terminal; and the second main inductor terminal being connected to the inductor assembly common terminal.

15. The soft switching interleaved power converter of claim 3 wherein said inductor assembly comprises at least two commutation inductors, and a main inductor having first and second main inductor terminals; each commutation inductor being connected between a separate inductor assembly input terminal and the first main inductor terminal;

and the second main inductor terminal being connected to the inductor assembly common terminal.

16. The soft switching interleaved power converter of claim 14 wherein at least two of said commutation inductors are wound on a common core structure.

17. The soft switching interleaved power converter of claim 15 wherein at least two of said commutation inductors are wound on a common core structure.

18. The soft switching interleaved power converter of claim 1 wherein said inductor assembly comprises at least two coupled inductors, with each inductor connected between a separate inductor assembly input terminal and the inductor assembly common terminal.

19. The soft switching interleaved power converter of claim 3 wherein said inductor assembly comprises at least two coupled inductors, with each inductor connected between a separate inductor assembly input terminal and the inductor assembly common terminal.

* * * * *